United States Patent [19]

Tanaka

[11] Patent Number: 5,398,303
[45] Date of Patent: Mar. 14, 1995

[54] FUZZY DATA PROCESSING METHOD AND DATA SMOOTHING FILTER

[75] Inventor: Masato Tanaka, Kanagawa, Japan

[73] Assignee: Yamatake-Honeywell Co., Ltd., Tokyo, Japan

[21] Appl. No.: 843,751

[22] Filed: Feb. 28, 1992

[51] Int. Cl.⁶ .................................................. G06F 9/44
[52] U.S. Cl. .......................................... 395/51; 395/3; 395/900
[58] Field of Search ................... 395/10, 3, 51, 61, 900

[56] References Cited

U.S. PATENT DOCUMENTS 5,007,101  4/1991  Iwahashi et al. ...................... 382/42

Primary Examiner—Robert W. Downs
Attorney, Agent, or Firm—Lane, Aitken & McCann

[57] ABSTRACT

A unique data processing method and a fuzzy smoothing filter are disclosed which employ a three-dimensional elliptic membership function based on the fuzzy logic to remove noises from data including a sequence of measured points for evaluating the linearity of the measured points. The evaluation is carried out by superimposing the center of an ellipse represented by an elliptic membership function on a substantial central portion of inputted data, evaluating a factor representing the linearity of the inputted data by summing the degrees of membership derived at respective inputted data, calculating the ratio of the factor to a factor representing an ideal linearity of the inputted data, rotating the ellipse by a predetermined angular distance to derive the ratio at that position, repeating the rotating step until the peak is found, and determining the ratio when the peak is found as the linearity of the inputted data. The fuzzy smoothing filter is comprised of a data input for inputting data to be smoothed, a multi-dimensional membership function generator for calculating a degree of membership for the inputted data, a calculator for deriving an angle of the data and calculating the linearity of the data, smoothing processors coupled to receive the angle and the linearity of the data from the calculator for executing a smoothing operation in a plurality of modes, a selector for selecting one mode from among the plurality of smoothing modes, and a store for holding smoothing filter parameters supplied to the calculator and the selector.

1 Claim, 22 Drawing Sheets

Gaussian type membership function

FUZZY DATA PROCESSING METHOD AND DATA SMOOTHING FILTER

BACKGROUND OF THE INVENTION

1. Field of the Invention

This invention generally relates to data processing, and more particularly, to a method of smoothing data including noises and a data smoothing filter utilizing so-called fuzzy logic.

2. Description of the Prior Art

In a variety of measurements of physical quantities for controlling a machine which is used, for example, in the manufacturing industry, data obtained by such a measurement may be linearly distributed, if plotted on the x-y coordinates. For such linearly distributed data, a least squares method is employed for evaluating the linearity of a line constituted of the plotted data or points and deriving the angle formed by the line and the x-axis for predicting a future trend.

Among these n data points, if even one data point is located away from a straight line constituted of the remaining n−1 points, a statistical method such as the least squares method derives an angle different from an angle which would be derived based on the straight line constituted of the n−1 points.

Consider, for example, a case where a measurement has been made for a physical phenomenon to obtain n points which would have been linearly distributed, where n−1 points have been exactly measured to draw a straight line, however, only one point was disturbed by a noise and therefore plotted at a location away from the straight line. In this case, it would be correct to derive an angle formed by the x-axis and a straight line constituted of the n−1 points as the angle formed by the x-axis and a line constituted of measured data since the one point indicates erroneous data. A human can readily remove the exceptional point to select a correct angle and draw a straight line constituted of the remaining correct n−1 points.

The above-mentioned operation based on human judgement, however, is quite difficult to implement in known apparatus since such removal of exceptional points and selection of a correct angle are not a domain for machines. For example, if threshold values are provided for removing exceptional points, a slight difference (e.g. a small disturbance by noise) may result in large variation in derived straight lines and angles. Therefore, such straight lines and angles of data points derived by a conventional data processing apparatus tend to be different from human's sense. Although it is sometimes preferable to detect a straight line and measure an angle with human intuitive judgement, the prior art has not been able to carry out such human-like judgment by means of data processing apparatus.

As typically represented by a state observation of a system, e.g., a plant, a trend of the state and state transition of the system cannot be precisely predicted in many cases due to noises and probabilistic variations. However, as long as the mathematic model of the system is precisely described and the statistical characteristics of the noise has been analyzed, a state forecast may be carried out by means of a Karman filter. On the other hand, it is rather difficult or impossible to describe mathematic models for many existing systems, and a reliable state forecast, using a Karman filter, as mentioned above, will not be readily achieved.

More specifically, measured values, constantly disturbed by random noises as shown in FIG. 1, cannot be used for forecasting a state or state transition of a system. Conventionally, this type of measured data is analyzed by statistical techniques such as regression and moving average methods. In the case of large noises exceptionally present as shown in FIG. 2, conventional statistical techniques cannot provide highly reliable state forecasting. It is therefore necessary to employ another technique (e.g., differentiation) for removing such exceptional noises (spot noises). Thus, in conventional data processing, different techniques must be used for removing different kinds of noises. Thus, a single technique has not been able to appropriately process data including a plurality of kinds of noises.

As stated above, a human can readily remove exceptional points by subjective judgement to carry out a relatively highly reliable state forecasting. Full lines in FIGS. 1 and 2 respectively indicate an example of a smoothing performed by the inventor's subjective judgement for removing noises to estimate true data. Such data smoothing resulted from rather fuzzy knowledge and judgment for analyzing a graph of measured data. Although such knowledge and judgment do not provide precise state forecasting, such smoothed data may be important in effective data processing for displaying measured values of a system or performing a predictor control.

SUMMARY OF THE INVENTION

It is an object of the present invention to provide a data processing method capable of automatically removing exceptional points included in measured data points plotted on an orthogonal coordinate system, to thereby derive a correct angle formed of a line constituted of the data points and a coordinate axis and evaluate the linearity of the line.

It is another object of the invention to provide a data smoothing method which is capable of automatically performing a smoothing processing for data including a variety of different kinds of noises in a manner similar to human's sense.

It is a further object of the invention to provide a data smoothing filter for smoothing data including a variety of different kinds of noises having different statistical properties.

It is yet another object of the invention to provide dynamic adjustment of weighting of the results of a plurality of smoothing techniques to minimize deviation and divergence of the smoothed data from the original data.

According to a first aspect of the invention, there is provided a method of evaluating the linearity of inputted data in an orthogonal coordinate system comprising the steps of:

(a) superimposing the center of an ellipse represented by an elliptic membership function on a substantial central portion of inputted data;

(b) evaluating a factor representing the linearity of the inputted data by summing the degrees of membership derived at respective inputted data;

(c) calculating the ratio of the factor to a factor representing an ideal linearity of the inputted data;

(d) rotating the ellipse by a predetermined angular distance to derive the ratio at that position;

(e) repeating the rotating step until the peak is found; and (f) determining the ratio when the peak is found as the linearity of the inputted data.

According to a second aspect of the invention, there is provided a fuzzy smoothing filter for smoothing data including a sequence of measured points plotted in an orthogonal coordinate system comprising:
  a data input means for inputting data to be smoothed including a plurality of data points;
  a multi-dimensional membership function generating means for calculating a degree of membership for the inputted data;
  a calculation means for deriving an angle of the data and calculating the linearity of the data;
  smoothing means coupled to receive the angle and the linearity of the data from the calculation means for executing a smoothing operation in a plurality of modes;
  a selector means for selecting one mode from among the plurality of smoothing modes; and
  a storage means for holding smoothing filter parameters supplied to the calculation means and the selector means.

The above and other objects, features and advantages of the invention will become more apparent from the following detailed description of the preferred embodiments with reference to the accompanying drawings.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Explanation will be first given of a method of evaluating the linearity of a line constituted of measured data points and measuring an angle of the line with respect to a coordinate axis based on the linearity evaluation, using a three-dimensional membership function defining a fuzzy set.

Figure 1:
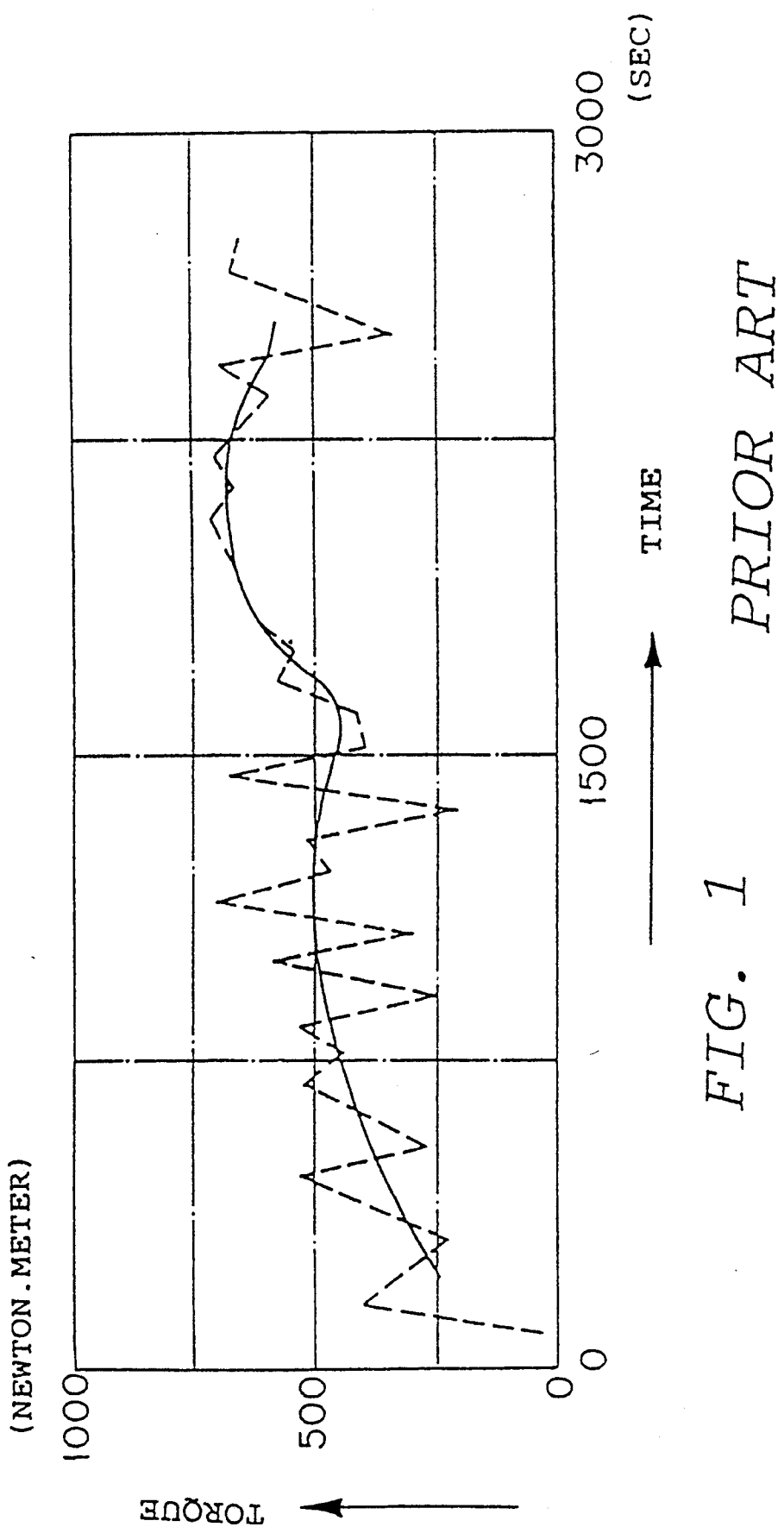
FIG. 1 is a graph showing an example of data disturbed by random noises and smoothing the same by human judgement.
Figure 2:
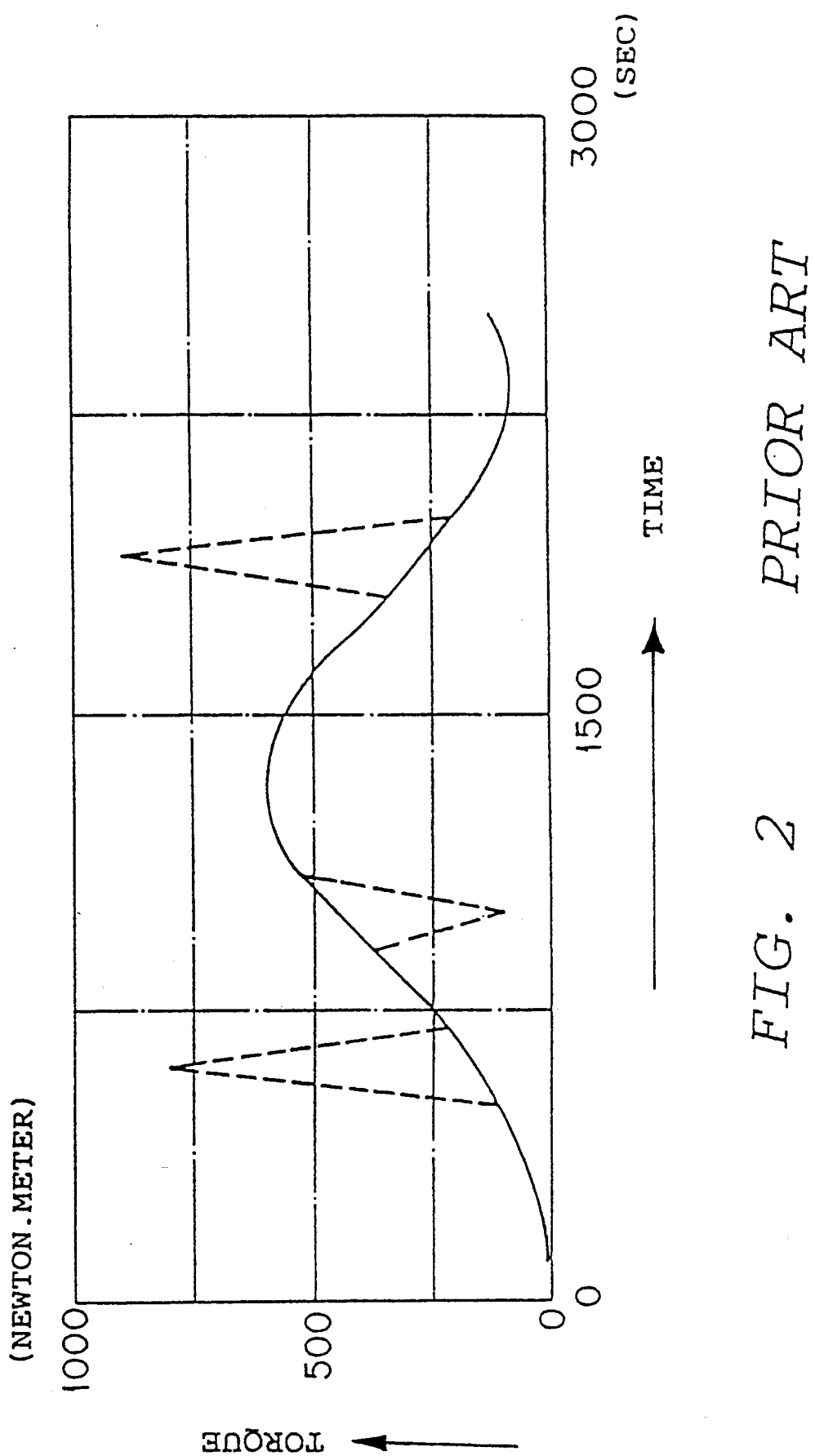
FIG. 2 is a graph showing an example of data including exceptional noises and smoothing the same by human judgement.
Figure 3:
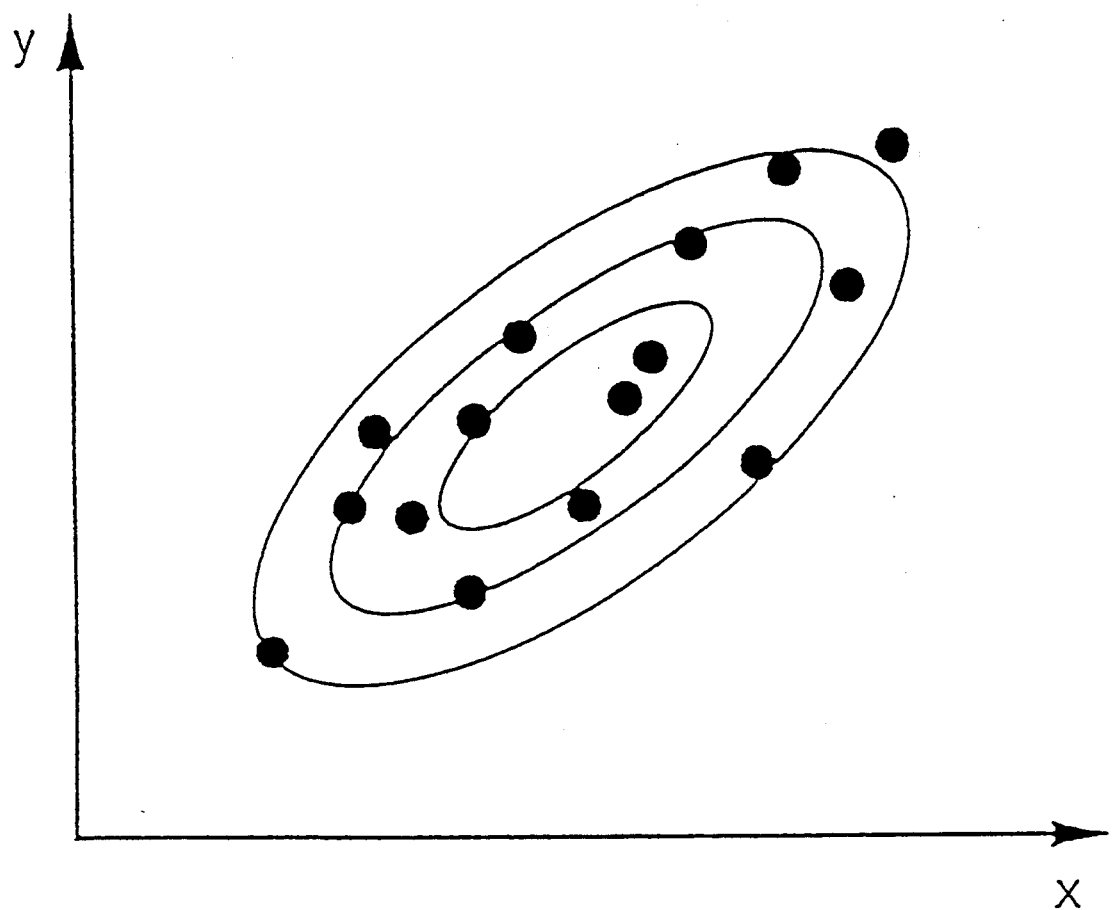
FIG. 3 is a diagram used for explaining how a human recognizes the correlation between two variables.

Generally, a linear relation or correlation between two variables are many times shown in the form of a distribution diagram on the orthogonal coordinate system where the two variables are represented by the abscissa and ordinates. When data points of normally distributed two variables have an elliptic contour as shown in FIG. 3, a human generally tends to judge the correlation between two variables based on the elliptic contour (a ratio of the minor axis to the major axis of the ellipse).

For evaluating the linearity of a finite line constituted of measured data points, the present embodiment employs an algorithm of determining an elliptic "rule" on the coordinate space and superimposing the major axis of the elliptic rule on the line constituted of measured data points. This algorithm will hereinbelow be described in detail.

Figure 4:
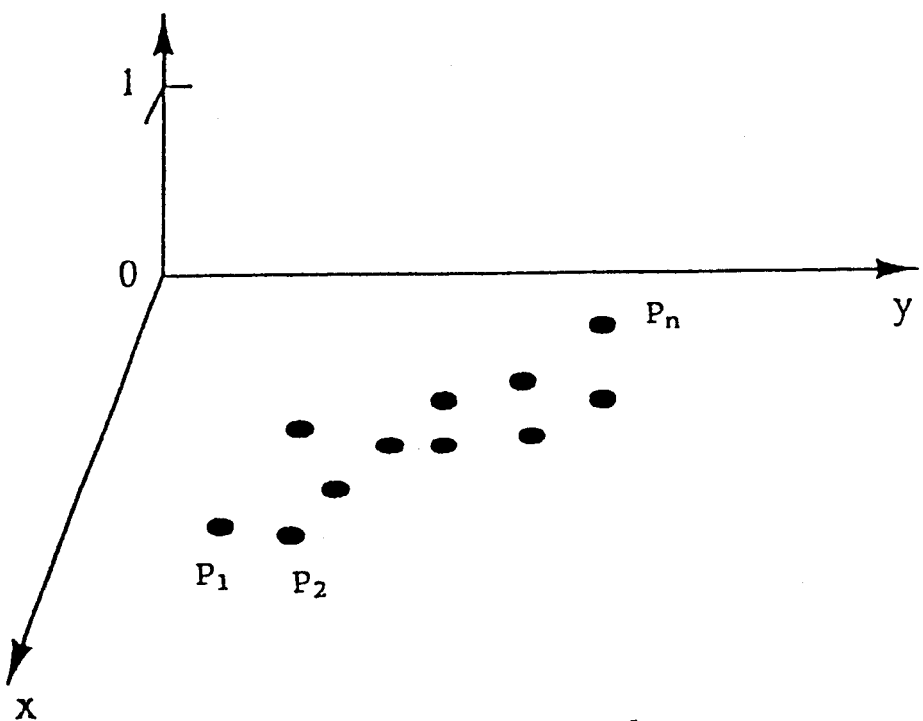
FIGS. 4 and 5 are graphs showing a virtual three-dimensional space.
Figure 5:
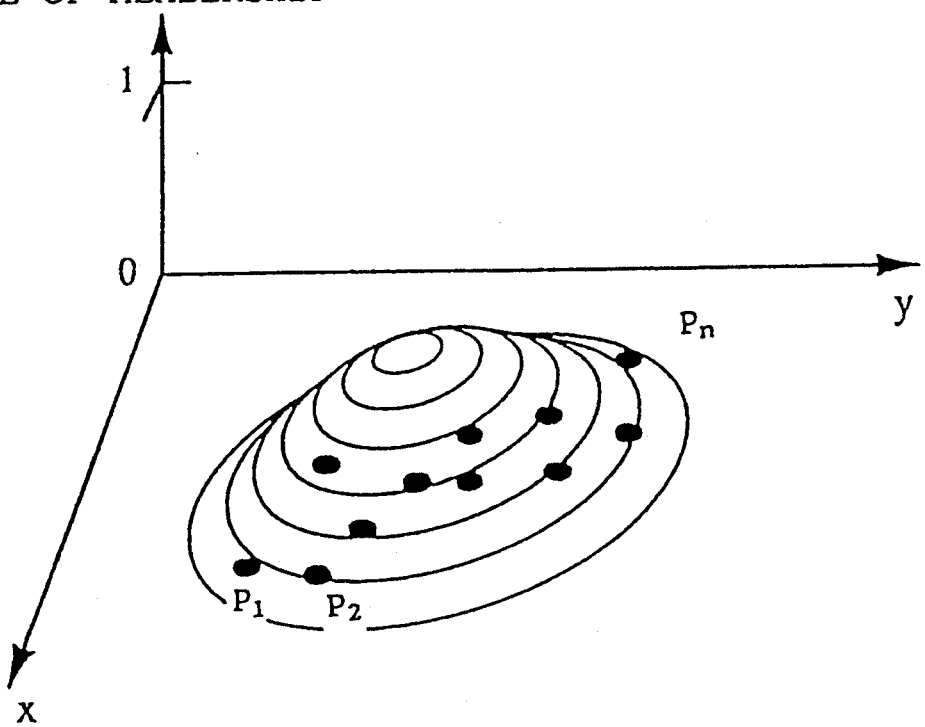

Suppose that a virtual three-dimensional space composed of an x-y orthogonal coordinate and a degree of membership of the fuzzy calculation is defined, and a line constituted of linearly plotted points $P_1(x_1, y_1)$, $P_2(x_2, y_2)$, ..., $P_n(x_n, y_n)$ exists on the xy-plane (see FIGS. 4 and 5).

Figure 6:
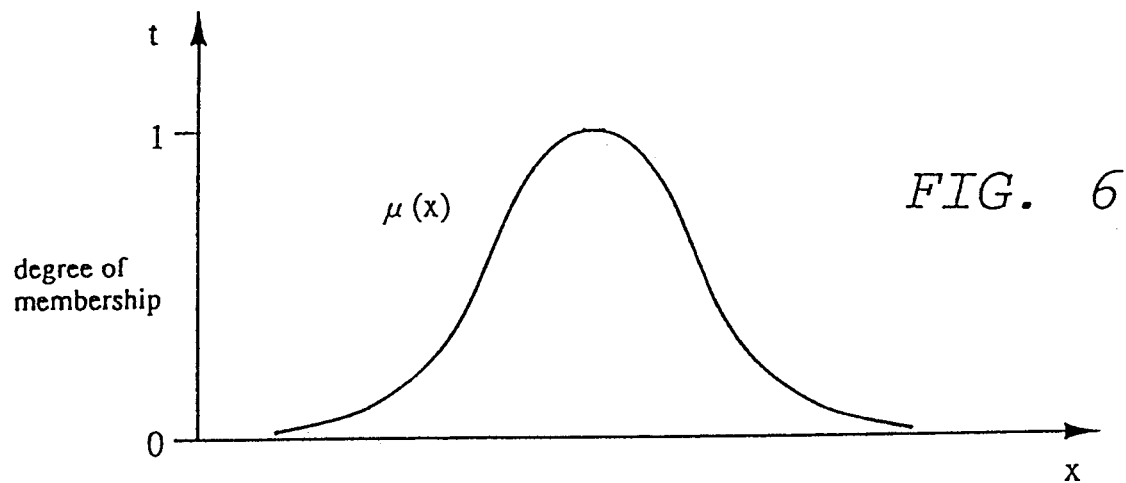
FIG. 6 is a graph showing an example of a Gaussian type membership function in a two-dimensional domain.
Figure 7:
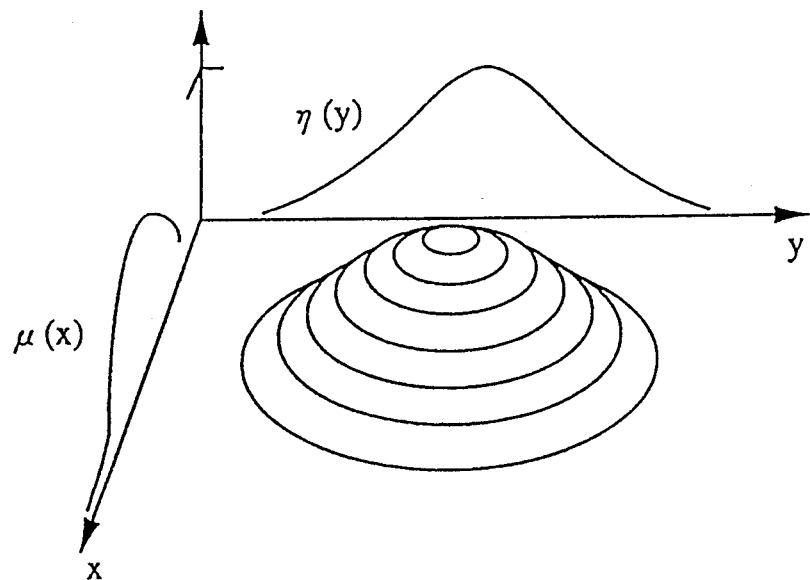
FIG. 7 is a graph showing the membership function of FIG. 6 in a three-dimensional domain.

Two-variate normally distributed data forming an elliptic contour means in a mathematical sense that the product of two Gaussian membership functions as shown in FIGS. 6 and 7 (represented by functions in an identical form to the normal distribution) forms a three-dimensional elliptic membership function. This three-dimensional elliptic membership function is shown in FIG. 5 as superimposed on the data points of FIG. 4. Based on this definition, a three-dimensional membership function given by the following equation (1) is determined for evaluating the linearity of the line:

$$t = exp[-\{(x/a_x)^2 + (y/a_y)^2\}] \qquad (1)$$

Incidentally, this equation assumes that the major axis of the ellipse is placed on the x-axis and the minor axis of the same on the y-axis.

Next, the center of the ellipse is moved to a point on the line at which the evaluation of the linearity is regarded most important. Generally, this point is one in the vicinity of the center of the n points constituting the line. The coordinates of the center of the ellipse is indicated by (A, B). The ellipse is then rotated with the thus selected point as the center by an angular distance $\theta$. The three-dimensional elliptic membership function is given by the following equation (2):

$$t = M(x, y, \theta) \quad (2)$$
$$= \exp[-\{(X/a_x)^2 + (Y/a_y)^2\}]$$

where $$X = (x-A)\cos\theta + (y-B)\sin\theta \quad (3)$$

$$Y = (x-A)\sin\theta + (y-B)\cos\theta \quad (4)$$

Figure 8A:
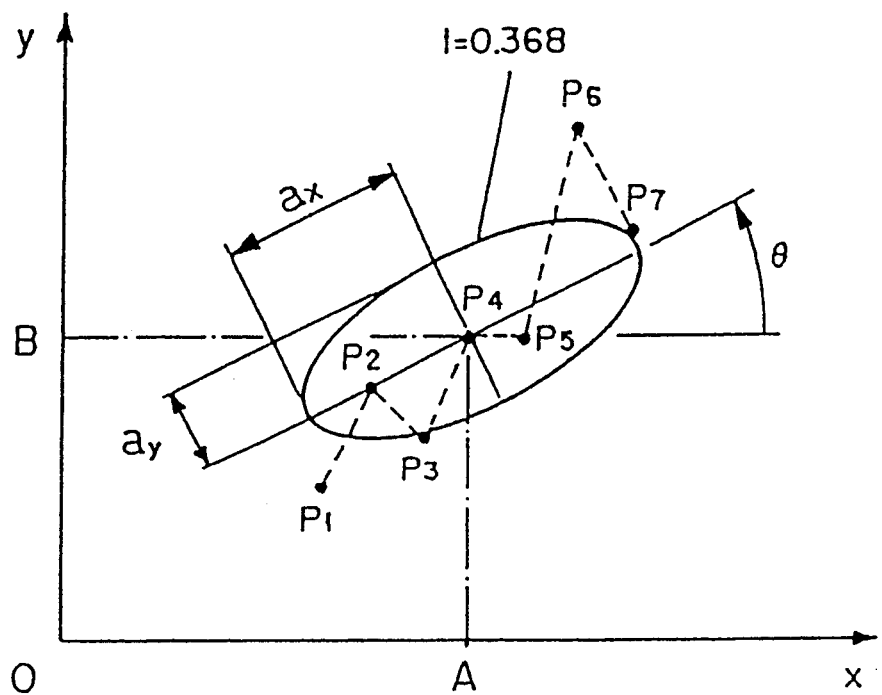
FIGS. 8A, 8B, 9A and 9B are graphs used for explaining three-dimensional elliptic membership functions.
Figure 8B:
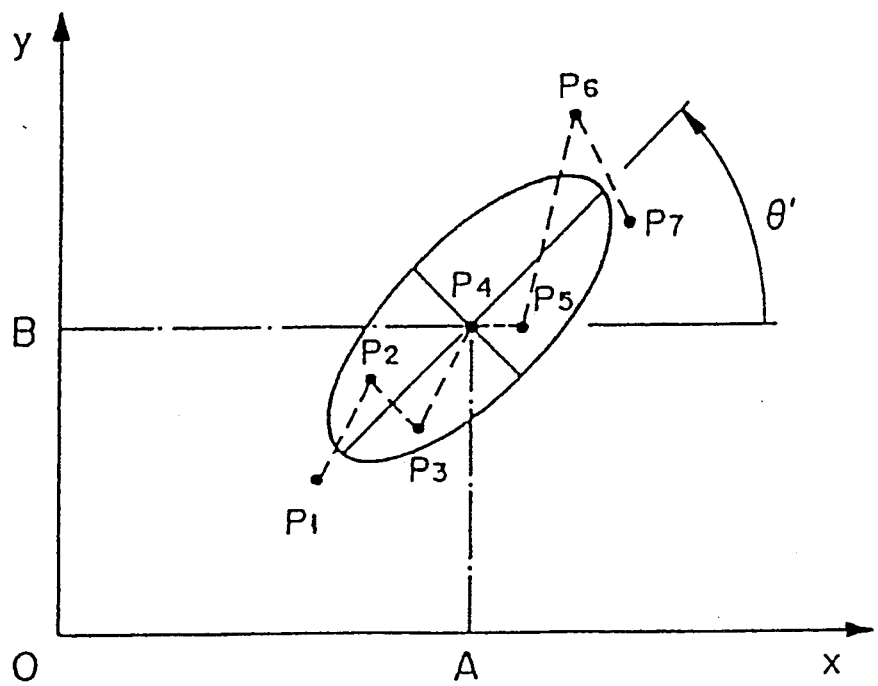

FIGS. 8A and 8B graphically illustrate the above equation (2) when the ellipse (corresponding, for example, to a particular contour (e.g. t=0.368) of the three dimensional elliptic membership function of FIG. 7) is rotated by angular distances $\theta$ and $\theta'$, respectively In this particular embodiment, this type of the linearity evaluation for the line constituted of points Pi (i=1, 2, ...) is referred to as "Type 1".

Next, if a parameter represented by the x-axis does not influence variations of the data points (for example, the x-axis represents the time, and the time is being correctly measured), the linearity evaluation should depend only on a parameter represented by the y-axis, as will be later described. With such an assumption, the three-dimensional membership function is given by the following equation (5):

$$t = M(x, y, \theta) \quad (5)$$
$$= \exp[-\{(X/a_x')^2 + (Y/a_y)^2\}]$$

where $$X = (x-A)/\cos\theta \quad (6)$$

$$Y = -(x-Z)\tan\theta + (y-B) \quad (7)$$

$$a_x' = a_x/\cos\theta \quad (8)$$

Figure 9A:
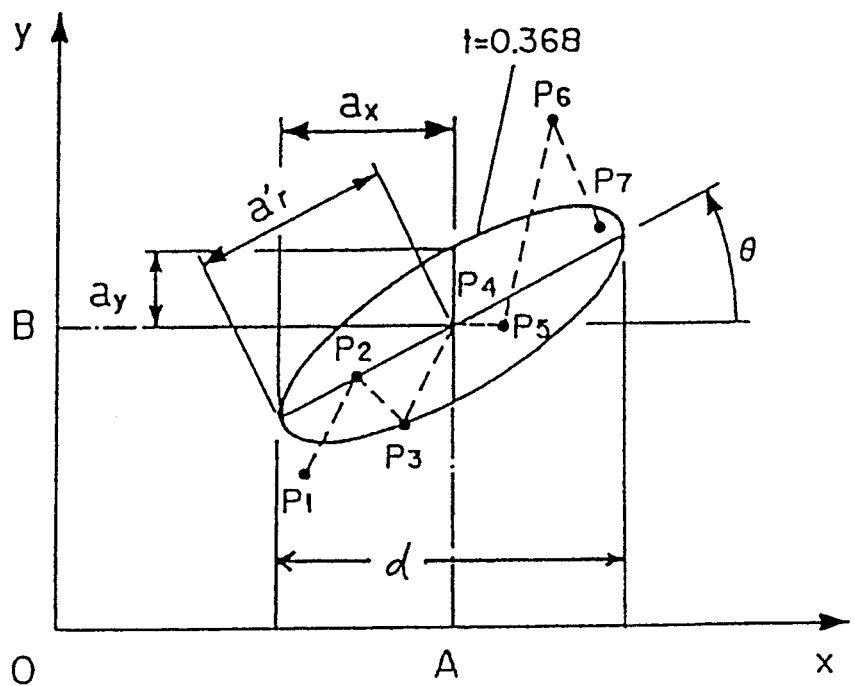
Figure 9B:
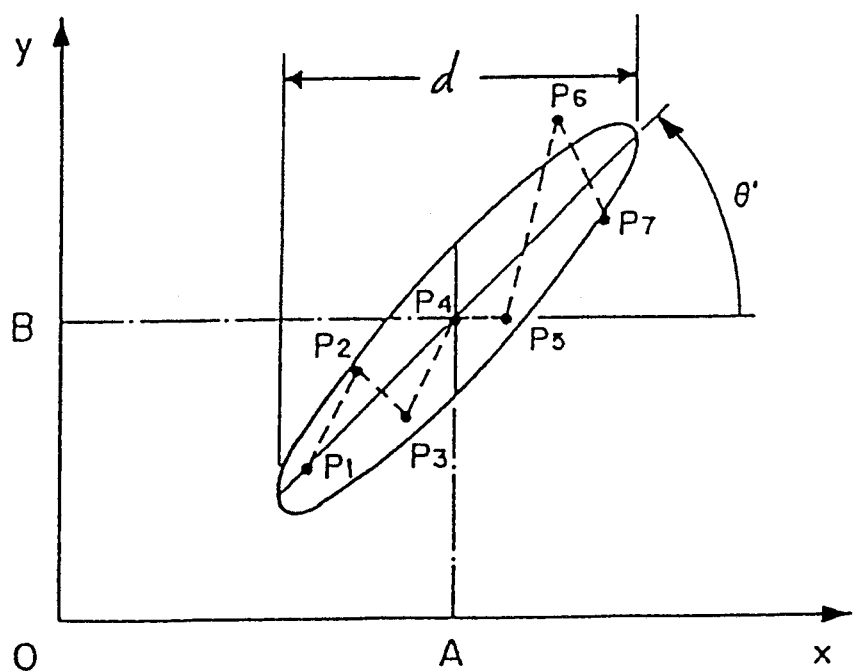

FIGS. 9A and 9B graphically illustrate the above equation (5) when the ellipse (again corresponding to the t=0.368 contour of the three dimensional elliptical membership function of FIG. 7) is rotated by angular distances $\theta$ and $\theta'$, respectively. Since, in this case, data in the x-direction is not subject to noise, dimension d is the same in both figures. This type of linearity evaluation for the line constituted of points Pi (i=1, 2, ...) is referred to as "Type 2".

The rotation of the three-dimensional elliptic membership function refers to superimposing an elliptic "rule" for evaluating the linearity of a line constituted of data points on the line.

Figure 10A:
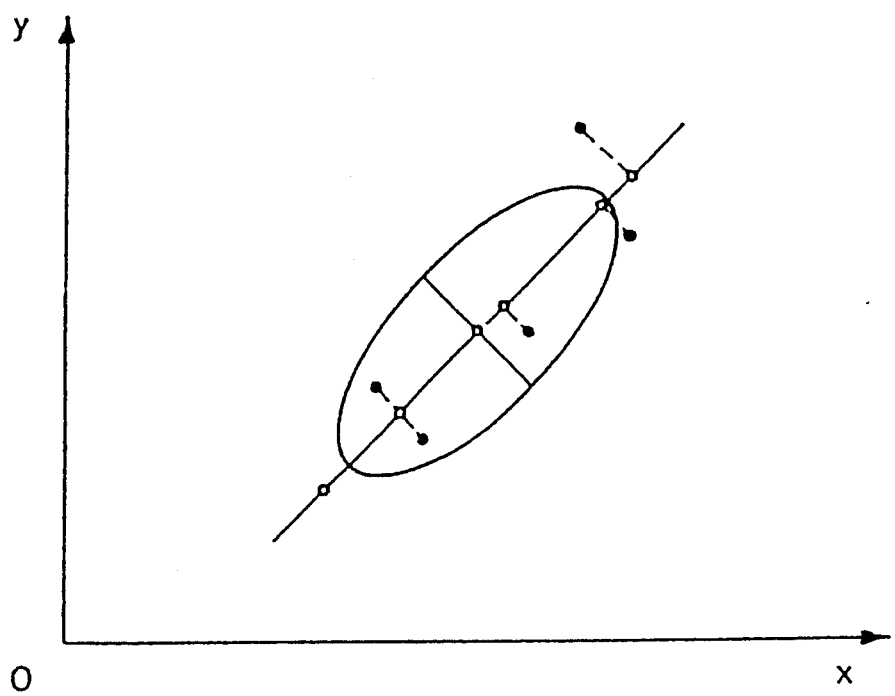
FIGS. 10A and 10B are diagrams used for explaining how the linearity evaluation is performed.
Figure 10B:
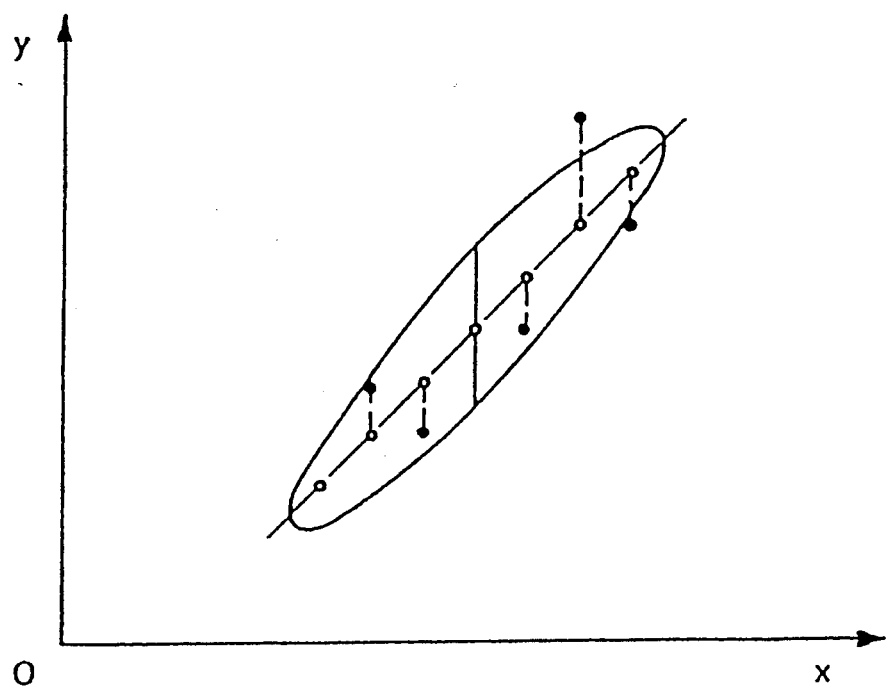

Therefore, the ratio of a total T($\theta$) of degrees of membership t1, t2, ..., tn at respective measured data points derived by the three-dimensional elliptic membership function when the elliptic "rule" is placed on the line at an arbitrary angle with respect to the x-axis and a total S($\theta$) of degrees of membership ts1, ts2, ..., tsn derived at respective positions on the major axis of the ellipse obtained by projecting the respective inputted data onto the major axis of the ellipse and parallel to the y-axis is defined as an evaluation value E($\theta$) of the linearity as shown in FIGS. 10A and 10B, respectively. Then, an angle $\Psi$ formed by the major axis of the ellipse and the x-axis when the evaluation value E($\theta$) is maximum is employed as an angle of the line constituted of the data points. In other words, E($\theta$) and E($\Psi$) are calculated by the following equations (9) and (10), respectively: (i)=1, 2, ..., 0)

$$E(\Psi) = \max\{E(\theta), -\pi/2 < \theta < \pi/2\} \quad (10)$$

When a sufficiently satisfactory evaluation value is not derived, it is effective to repeat the above calculation with the center of the ellipse placed at different points. In general, it is effective to evaluate a rough linearity with several points in the vicinity of the center of a line and then evaluate in detail the central point at which the highest linearity has been derived. This technique is adaptable or adjustable to a human's intuitive evaluation by changing the lengths of the major and minor axes of the ellipse.

The method of the present embodiment will hereinbelow be described in comparison with a conventional least squares method.

In general, the difference between the two methods may appear in the difference in the angle, with respect to the x-axis, of a line constituted of substantially linearly placed data points with a few points exceptionally placed away from the line, particularly when the exceptional point or points are located toward an end of an arbitrary segment of the line being analyzed.

Figure 11A:
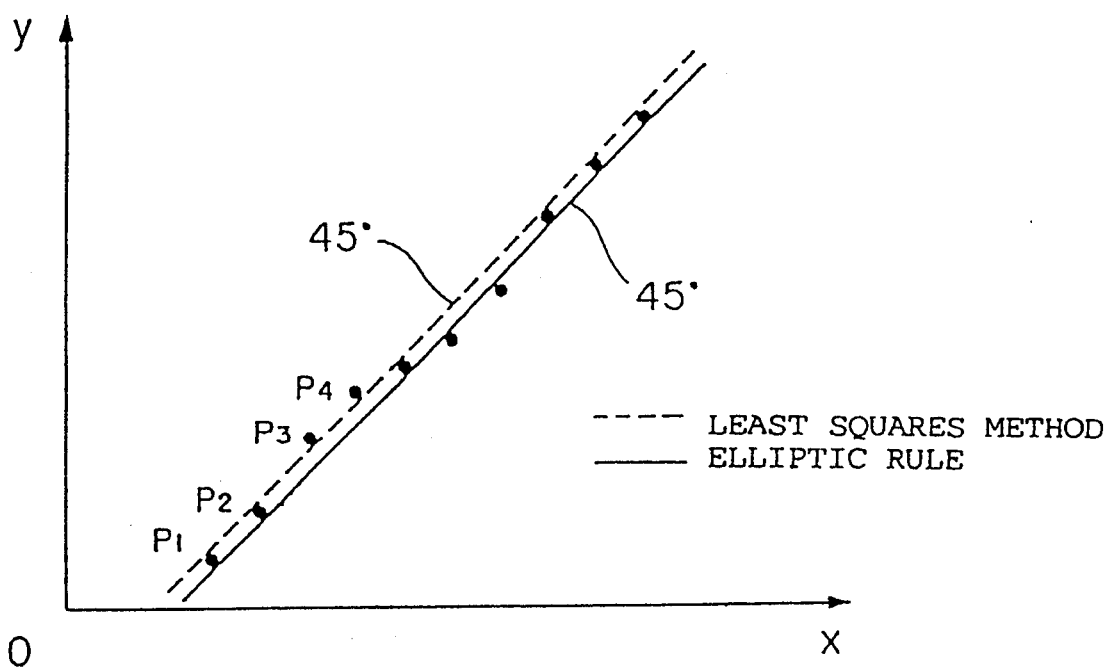
FIGS. 11, 12 and 13 are diagrams used for explaining the difference between the conventional least squares method and the elliptic rule of the invention.
Figure 11B:
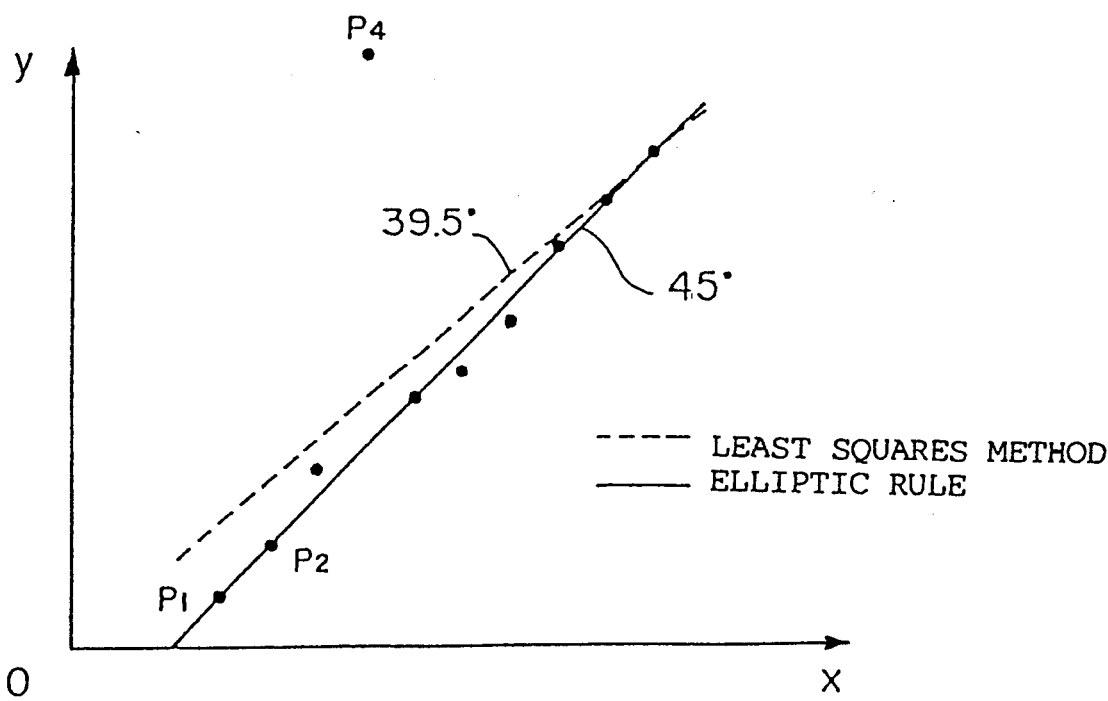

More specifically, when data points Pi (i=1, 2, ...) are substantially linearly placed as shown in FIG. 11A, there is little difference in the angle of the line formed by the data points between the full line derived by the elliptic rule of the present invention and the broken line derived by the conventional least squares method. Whereas, if there is an exceptional point (for example, P4) among the data points Pi as shown in FIG. 11B, the angle derived by the conventional least squares method is largely influenced by the point P4 as indicated by the broken line, whereby a correct angle, as that which may be judged by a human's intuition, cannot be provided. On the contrary, the method employing the elliptic rule of the present invention can derive a correct angle as indicated by the full line, removing the exceptional point P4, which is similar to the intuitive judgement of a person.

Further, with the elliptic rule, the linearity evaluation value or regression factor E($\Psi$) at an angle $\Psi$, derived by the foregoing equation (10), represents the certainty factor of the linearity of the line formed by the data points under measurement. Also, the linearity evaluation value E($\Psi$), since it is normalized within a range of 0 and 1, can be employed as the certainty factor CF relative to the angle. As is apparent from the definition of the linearity evaluation value E($\Psi$), the certainty factor CF exhibits a maximum value of 1 when data points are placed completely on a straight line.

Figures 12A, 12B:
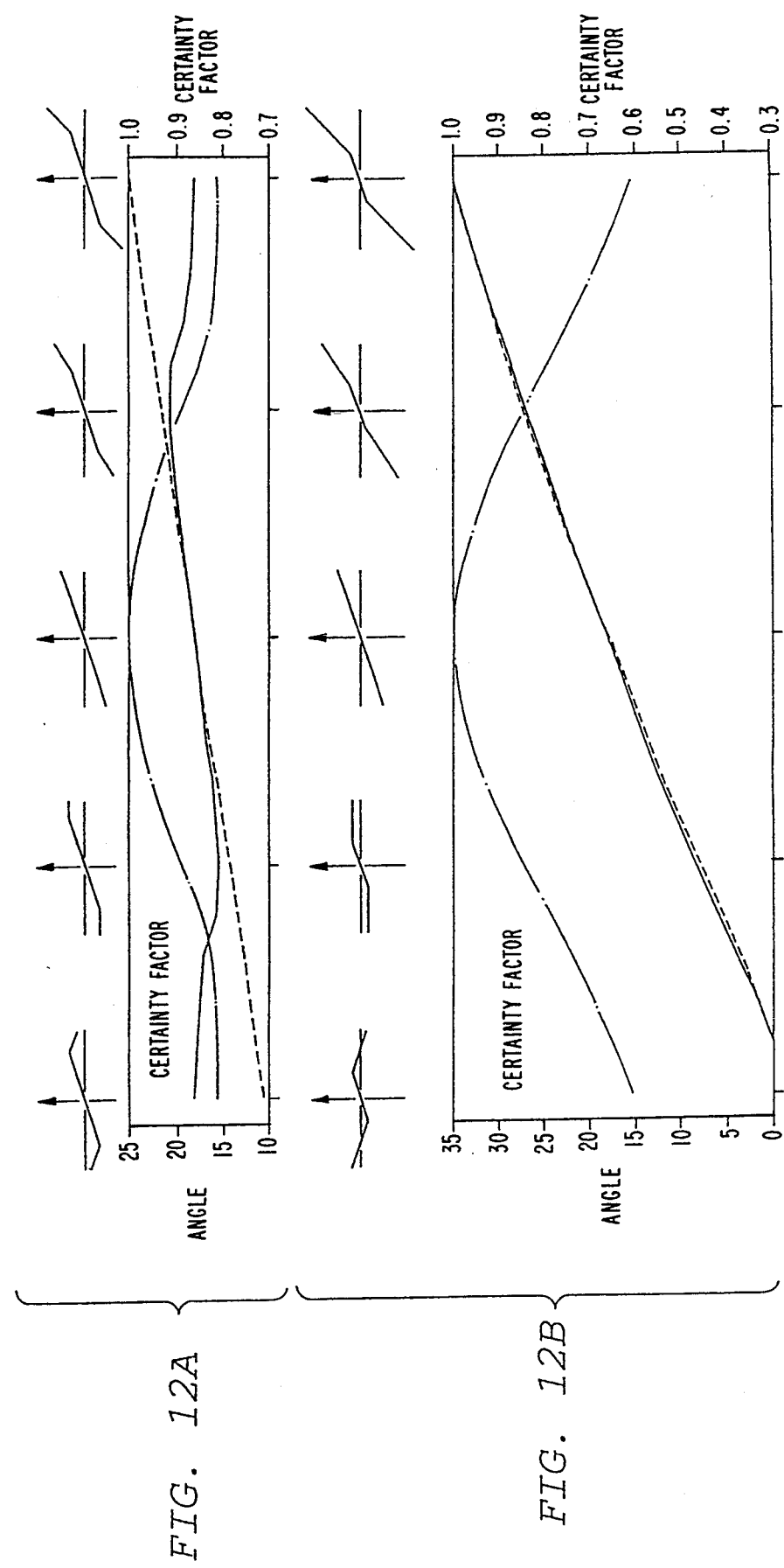
Figures 13A, 13B:
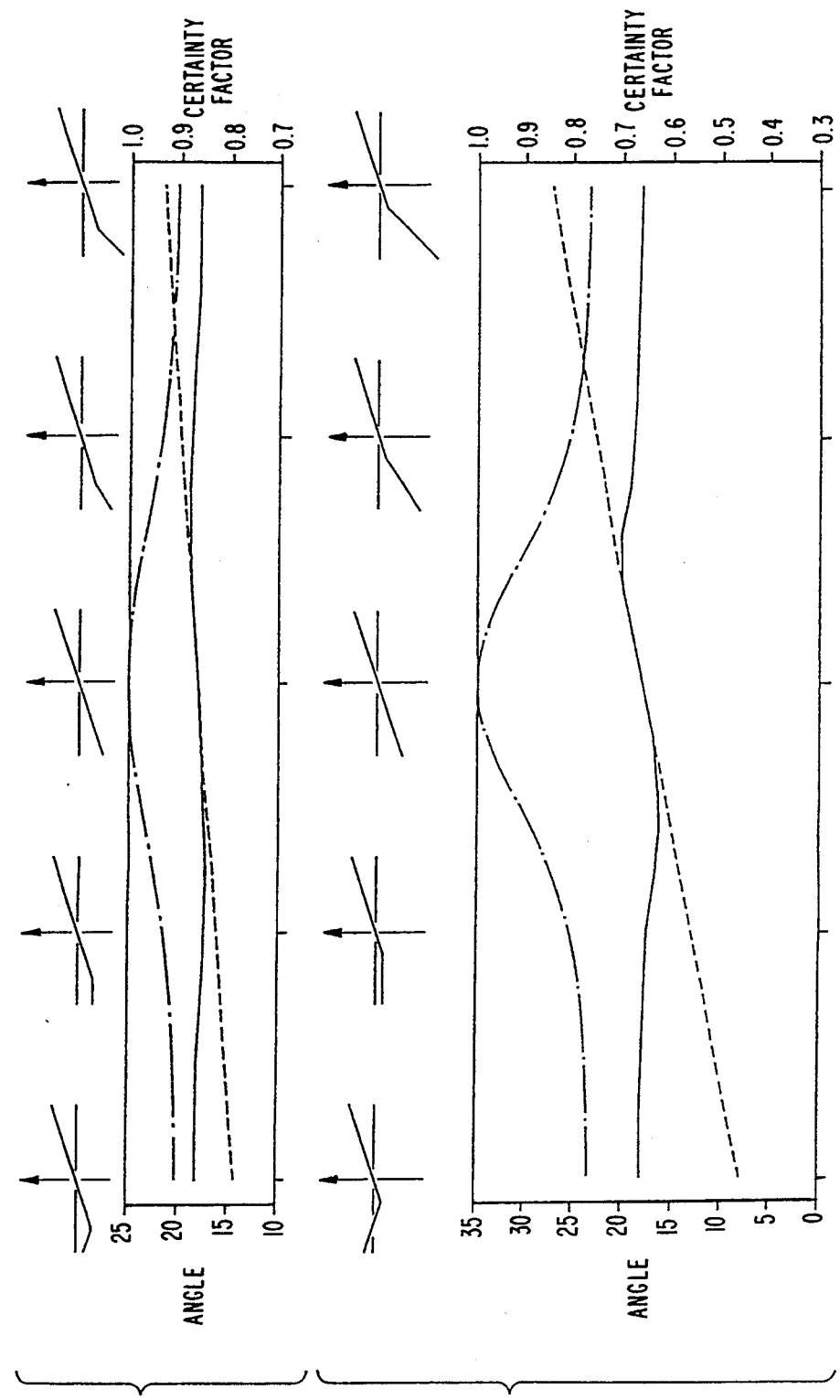

FIGS. 12A, 12B, 13A and 13B illustrate the difference between the method of the invention and a conventional least squares method in detail. More specifically, FIGS. 12A and 12B show cases where data points are taken to be distributed (for purposes of this comparison) as straight lines respectively having an arbitrary angle of 18° relative to the x-axis with both ends bent at certain angles varying from left to right, where the 18° line portion is longer in FIG. 12A than in FIG. 12B. For each of these lines with end portions bent as shown in the drawings, the method of the invention is applied to derive the certainty factor and the angle (the full line and the one-dot chain line, respectively) in accordance with the invention, while the conventional least squares method is applied to derive the apparent angle (the broken line) represented by the varying distribution of data points. FIGS. 13A and 13B similarly show cases where data points are taken to be distributed as straight lines respectively having an angle of 18° relative to the x-axis with the left side end thereof bent at a certain angle, where the 18° line portion is longer in FIG. 13A than in FIG. 13B. The method employing the elliptic rule is employed to derive the angle (indicated by the full line) and the certainty factor (indicated by the one-dot chain line) while the least square method is employed to derive the angle (indicated by the broken line).

As can be seen from these drawings, while the certainty factor is about one, that is, when the line is straight, the angle derived by the elliptic rule of the invention coincides with that derived by the least squares method. However, when the 18° line portion occupies more than half of the whole line, the difference between both angles become larger as the end portion or end portions are bent at a larger angle relative to the 18° line portion. This is because the elliptic rule of the invention regards the bent end portions as exceptional noises (e.g. the bent portions do not constitute the majority of the line but, rather, the majority of the line is constituted by the 18° portion). When bent portions occupy more than ⅔ of the whole line as shown in FIG. 12B, both methods present substantially identical results. This is because the bent portions are not regarded as being exceptional since these bent portions constitute the majority of the line. It will be appreciated, however, that the elliptic rule can provide an angle closer to 18° than the conventional least squares method (shown by the solid line corresponding to the invention being above the dashed line corresponding to the least squares method result when ends of the line are bent through a negative angle and vice-versa).

The present invention is based on an idea that the elliptic rule (three-dimensional elliptic membership function) is placed on the x-y plane such that the major axis thereof is superimposed on a line formed by data points. Alternatively, the elliptical rule can be considered as an application of fuzzy inference by the invention. More specifically, fuzzy rules are inferred from knowledge using fuzzy expressions (e.g. an ellipse is a fuzzy expression of a line having a length), membership functions are given to fuzzy variables in the fuzzy rules, the respective fuzzy variables are evaluated, and a total evaluation is made by a synthetic operation. The following may be considered as an example of such fuzzy knowledge: "A central portion of a line is given the first priority and the angle of the most linear portion of the line is regarded as the object of evaluation. Portions apparently having different angles from such a portion are removed from the object."

A fuzzy rule inferred from the above definition may be:

if near the center and close to a line with an angle $\theta$ then evaluation value=1

In the above fuzzy rule, for the fuzzy labels "near the center" and "close to a line with an angle $\theta$" the following membership functions (11) and (12) are respectively set as:

$$t_1 = \exp\left[-\frac{(x-A)^2}{a_x^2}\right] \quad (11)$$

$$t_2 = \exp\left[-\frac{(y-B)-(x-A)\tan\theta^2}{a_y^2}\right] \quad (12)$$

Then, an algebraic product t ($=t_1 * t_2$) is calculated:

$$t = t_1 * t_2 \quad (13)$$
$$= \exp\left[-\frac{(x-A)^2}{a_x^2} - \frac{(y-B)-(x-A)\tan\theta^2}{a_y^2}\right]$$

It can thus be seen that the above equation (13) is identical to the three-dimensional elliptic membership function of Type 2.

The most important aspect is the procedure of acquiring knowledge. The idea of the above-mentioned elliptic rule directly utilizes the image of a shape existing in the space, which, in other words, couples intuitive knowledge with the fuzzy logic. For acquiring knowledge, constituted of images of geometrical shapes as described above, multi-dimensional elliptic membership functions such as the three-dimensional one of the present embodiment are effective.

It should be noted that the coordinate system on which data to be processed is plotted is not limited to the orthogonal x-y coordinate system and other coordinate systems such as the polar coordinate system may be alternatively employed.

Next, explanation will be given of a data smoothing method using the above-mentioned data processing method. Basically, the data smoothing method of the invention is constituted of repetition of an identical smoothing process by using the three-dimensional membership function from the first one of data points subjected to the smoothing. Generally, 5–7 points are selected for a smoothing process. The measurement is classified into the following three modes depending on how a line formed by the data points is corrected or smoothed on the basis of the angle and certainty factor derived by each procedure. The procedure of a smoothing operation in each of the three modes will be hereinbelow described.

Figure 14:
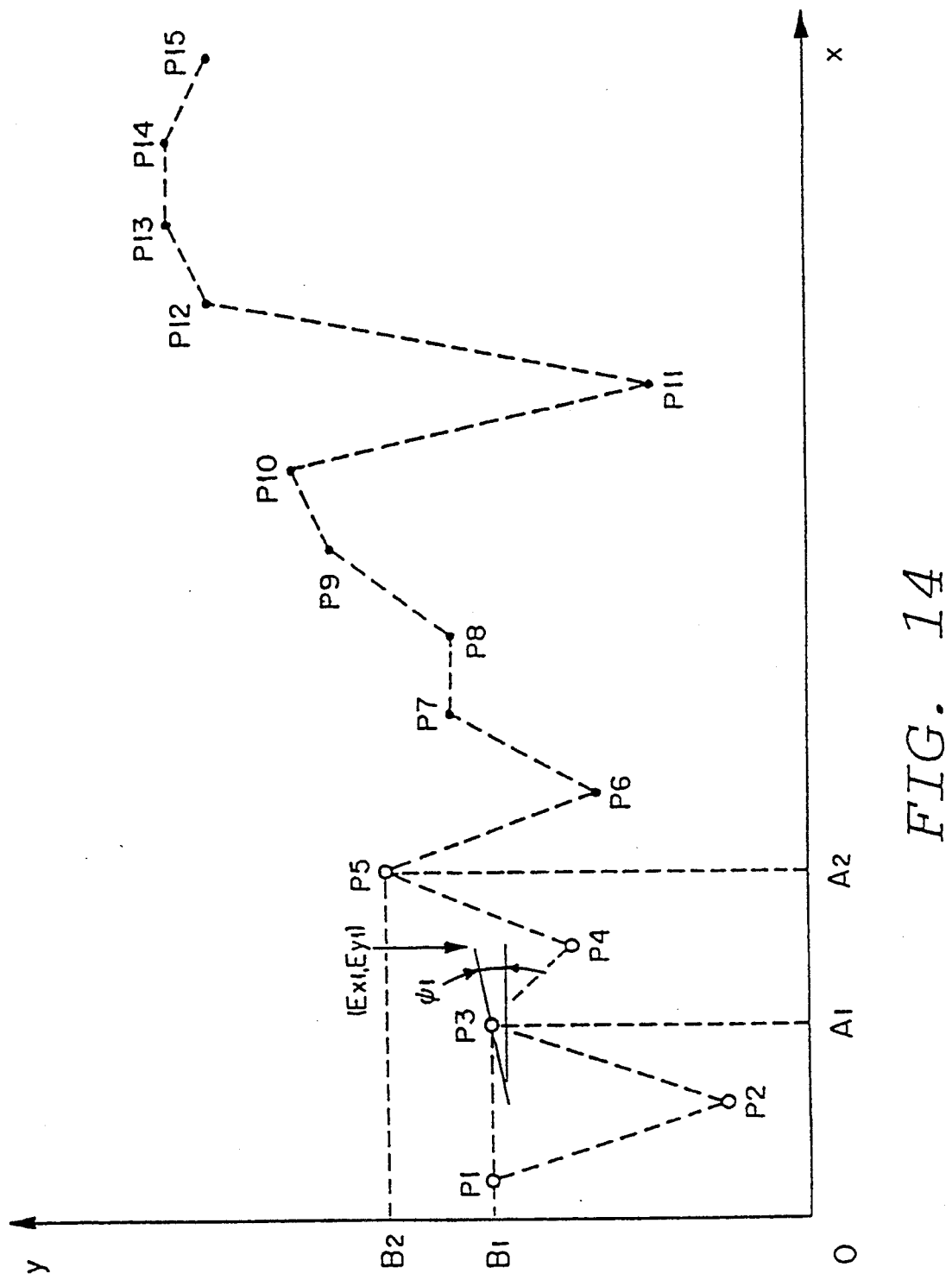
FIGS. 14, 15 and 16 are diagrams showing the procedure of a data smoothing in mode 1.
Figure 15:
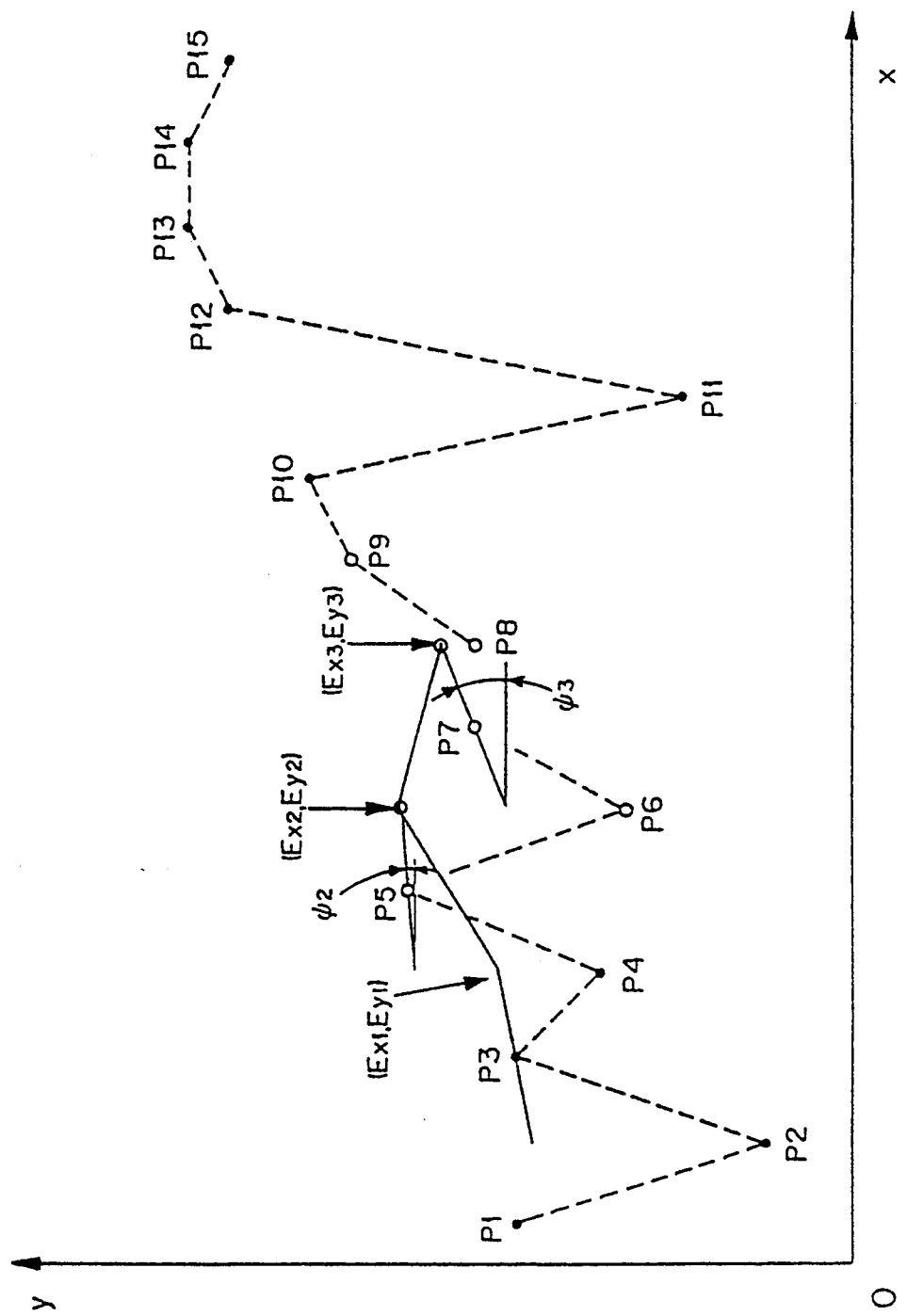
Figure 16:
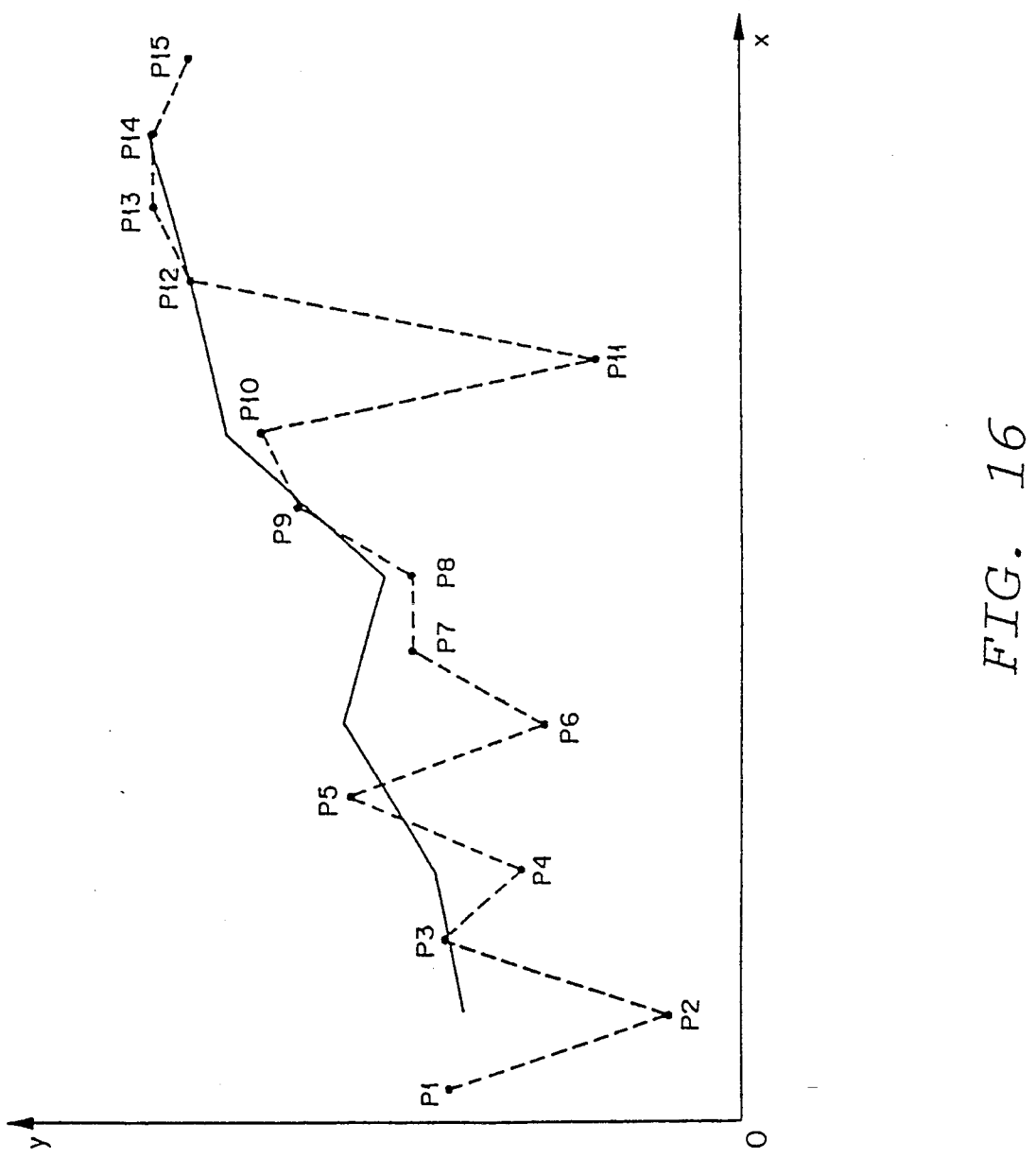

(1) Mode 1 (FIGS. 14–16)

In FIG. 14, there are shown equally spaced time-series data points P1–P15. For the first smoothing process, the left-most five points P1–P5 are selected, and the third point P3 from the left or the central point of the five is assigned to be the position at which the angle is measured and from which a first smoothed line is drawn. In other words, the center of the ellipse is placed on the point P3, the ellipse is rotated by an angle $\Psi_1$ to maximize the evaluation function $E(\theta)$ and a line passing the center of the ellipse at an angle $\Psi_1$ is drawn in the forward direction. The terminal point ($Ex_1$, $Ey_1$) of the thus drawn line is selected so as to be located at a median point in the x-direction between the center ($A_1$, $B_1$) of the ellipse and a point ($A_2$, $B_2$) which is to be assigned as the center of the ellipse in the next smoothing process. In FIG. 14, the point ($A_2$, $B_2$) is placed on the point P5.

The smoothing process from the second time is performed in the following procedure:

In FIG. 15, the point P5 is assigned as the center of the ellipse and five points P3–P7 are selected for the second smoothing process. Similarly, the point P7 is next assigned as the center of the ellipse and five points P5–P9 are selected for the third smoothing process.

Generally, a line passing the center (Ai, Bi) (i=2, 3, . . . ) of the ellipse, assigned for each of the smoothing process, at an angle $\Psi_i$ is drawn to the vicinity of a median point between the present center of the ellipse and the center $(A_{i+1}, B_{i+1})$ of the ellipse for the next smoothing process, and the terminal point of this line is determined to be at a point $(Ex_i, Ey_i)$, the coordinates of which are respectively given by:

$$Ex_i = \frac{A_i + A_{i+1}}{2}$$

$$Ey_i = B_i + \frac{(A_{i+1} - A_1)\tan\psi_i}{2}$$

Then, a smoothed line is drawn from the terminal point $(Ex_{i-1}, Ey_{i-1})$ of the line drawn in the preceding smoothing process to the point $(Ex_i, Ey_i)$ as a terminal point.

By repeating the above-described procedure, a smoothed line or a line formed by true data points without noises is drawn as indicated by a full line in FIG. 16.

With the smoothing in Mode 1, since the terminal point $(Ex_i, Ey_1)$ of a line drawn in a certain smoothing process is determined based on the center (Ai, Bi) of the ellipse in the smoothing process and the center $(A_{i+1}, B_{i+1})$ of the ellipse in the next smoothing process, information obtained by any individual smoothing process other than the first is not at all reflected in the determination of each of the terminal points of the lines drawn in the other respective smoothing processes. This is because Mode 1 gives priority to avoiding separation of a smoothed line from an actual line formed by data points (to be smoothed) over drawing a line as smooth as possible. It should therefore be noted that smoothing processes with a low certainty factor, if repeated, may result in producing little smoothing effect being produced in Mode 1.

Figure 17:
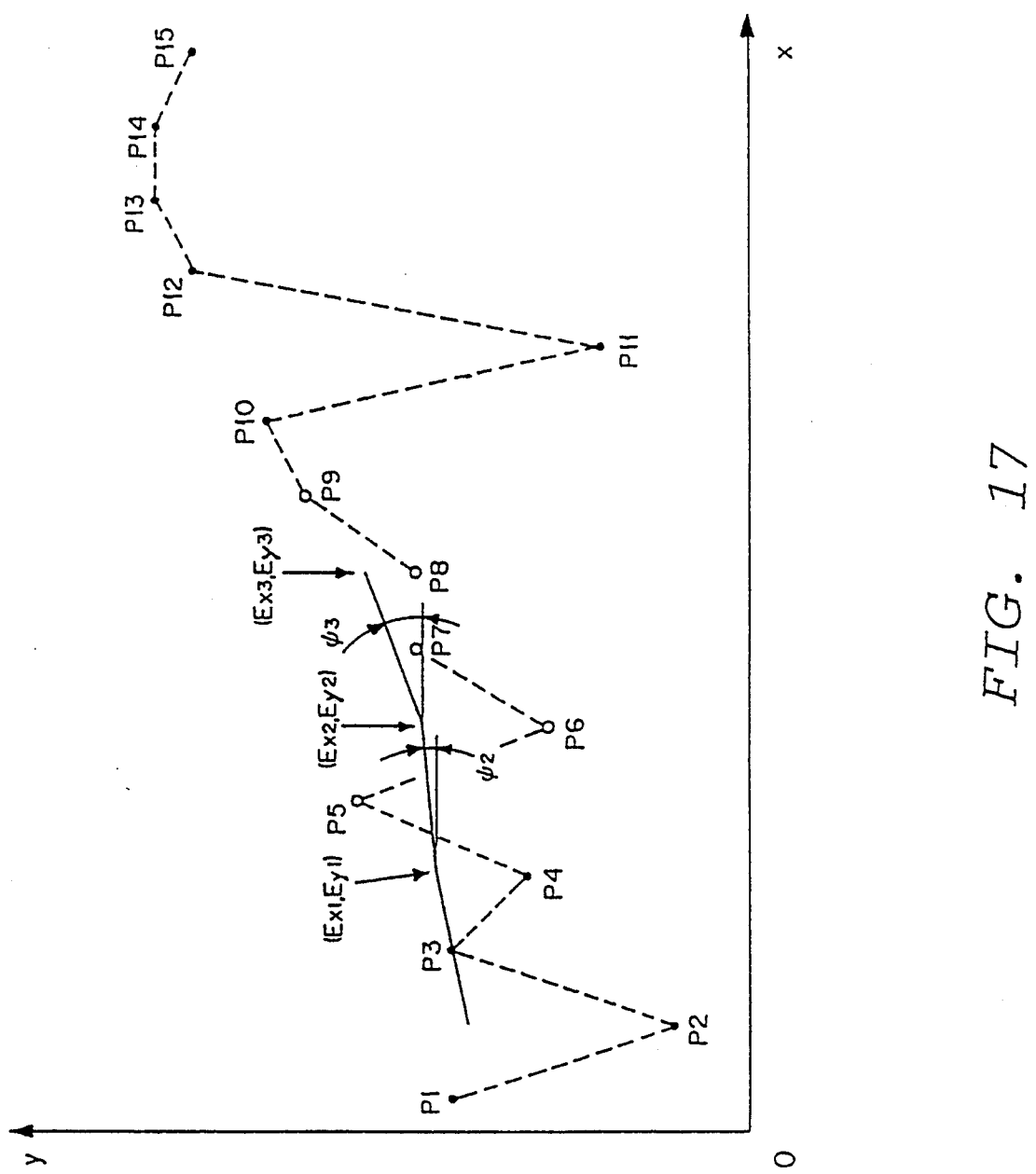
FIGS. 17 and 18 are diagrams showing the procedure of a data smoothing in mode 2.
Figure 18:
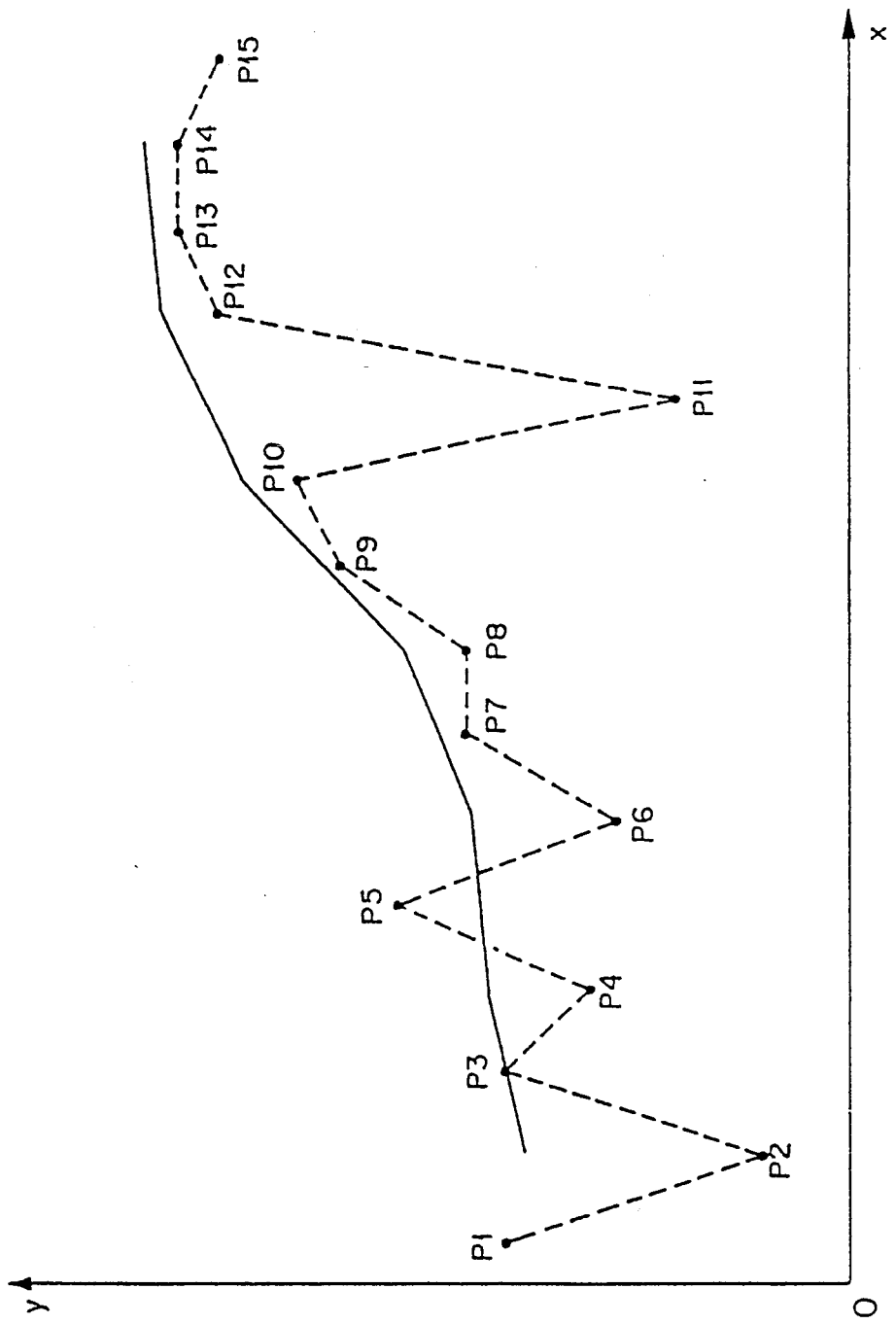

(2) Mode 2 (FIGS. 14, 17 and 18)

The first smoothing process according to Mode 2 is performed in a manner similar to the mode 1. That is, the left-most five points P1-P5 are selected, and the third point P3 from the left or the central one of the five points is assigned to be the position at which the angle is measured and from which a first smoothed line is drawn. In other words, the center of the ellipse is placed on the point P3, and a line passing the center of the ellipse at an angle $\Psi_1$ is drawn in the forward direction. The terminal point $(Ex_1, Ey_1)$ of thus drawn line is selected so as to be located at a median point between the center $(A_1, B_1)$ of the ellipse and a point $(A_2, B_2)$ which is to be assigned as the center of the ellipse in the next smoothing process. In FIG. 14, the next center $(A_2, B_2)$ is placed on the point P5.

The smoothing process for the second and subsequent times is performed in the following manner. First, an angle $\Psi_i$ formed by the major axis of the ellipse, the center of which is placed at (Ai, Bi), and the x-axis is measured, and a line is drawn from the terminal point $(Ex_{i-1}, Ey_{i-1})$ of the line drawn in the preceding smoothing process at the angle $\Psi_i$. The terminal point of this line is placed at a point $(Ex_i, Ey_i)$ in the vicinity of a median point between the current center (Ai, Bi) of the ellipse and the center $(A_{i+1}, B_{i+1})$ of the ellipse which is to be assigned for the next smoothing process. The coordinates $Ex_1$, $Ey_i$ are generally given by the following equations:

$$Ex_i = \frac{A_i + A_{i+1}}{2}$$

$$Ey_i = Ey_{i-1} + \frac{(Ex_i - Ex_{i-1})\tan\psi_1}{2}$$

In FIG. 17, the point P5 is assigned as the center of the ellipse and five points P3-P7 are selected for the second smoothing process. Similarly, the point P7 is next assigned as the center of the ellipse and five points P5-P9 are selected for the third smoothing process.

By repeating the above-described procedure, a smoothed line or a line formed by true data points with reduced noise is drawn as indicated by a full line in FIG. 18.

In the smoothing of Mode 2, the coordinates $(Ex_i, Ey_i)$ of the terminal point of a line drawn by the smoothing process carried out at a certain point depend on the coordinates of the terminal point $(Ex_{i-1}, Ey_{i-1})$ determined by the preceding smoothing process, wherein the coordinates (Ai, Bi) of the center of the ellipse is not taken into account. In other words, Mode 2 gives priority to faithfully reflect angles measured at respective points over avoiding separation of a smoothed line from an actual line formed by data points (to be smoothed). It is therefore possible that repetitive angle measurements with a low certainty factor result in that the smoothed line gradually separates from the actual data line. However, since a relatively smooth line is provided by Mode 2 compared with Mode 1, it will be preferable to select data points at which the smoothing process is to be executed and adjust the eccentricity of the ellipse so as to avoid the above-mentioned separation of the smoothed line and the actual line.

Figure 19:
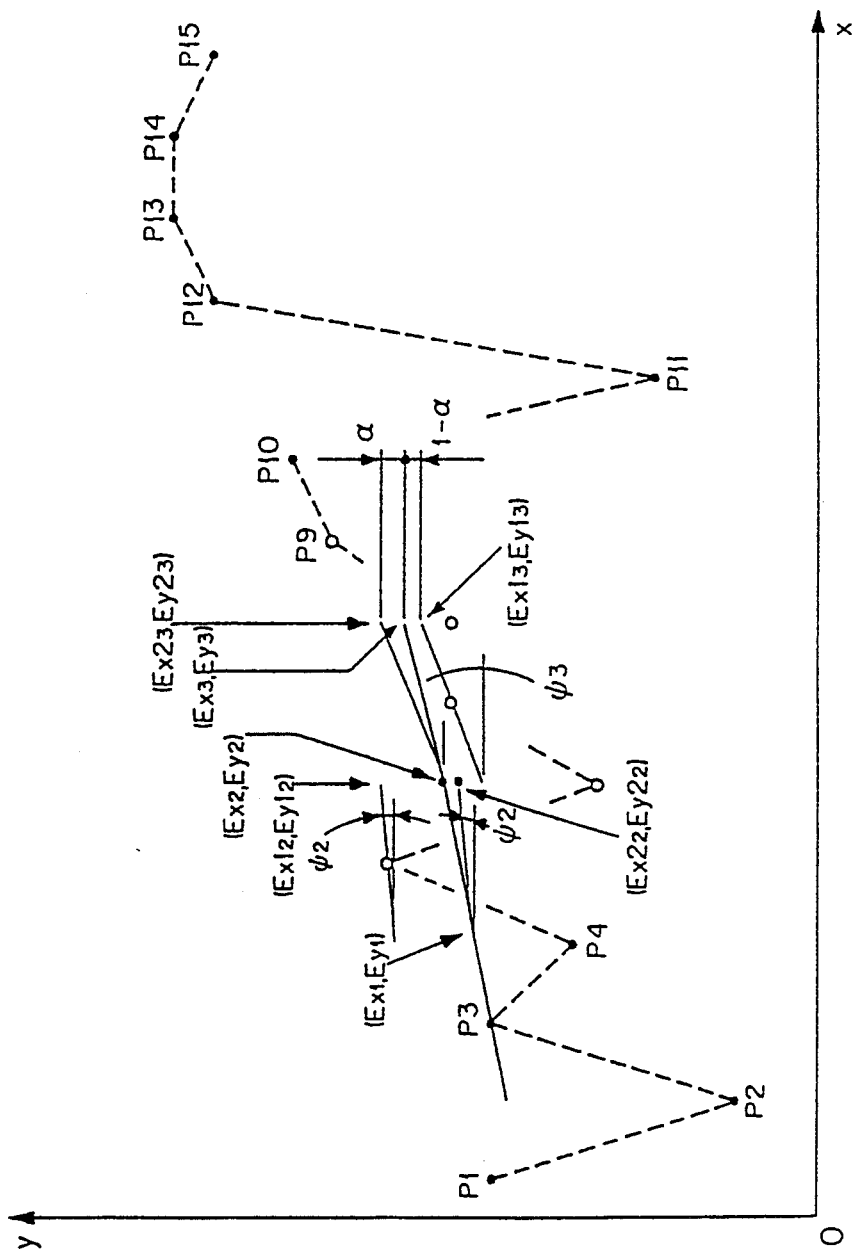
FIGS. 19 and 20 are diagrams showing the procedure of a data smoothing in mode 3.
Figure 20:
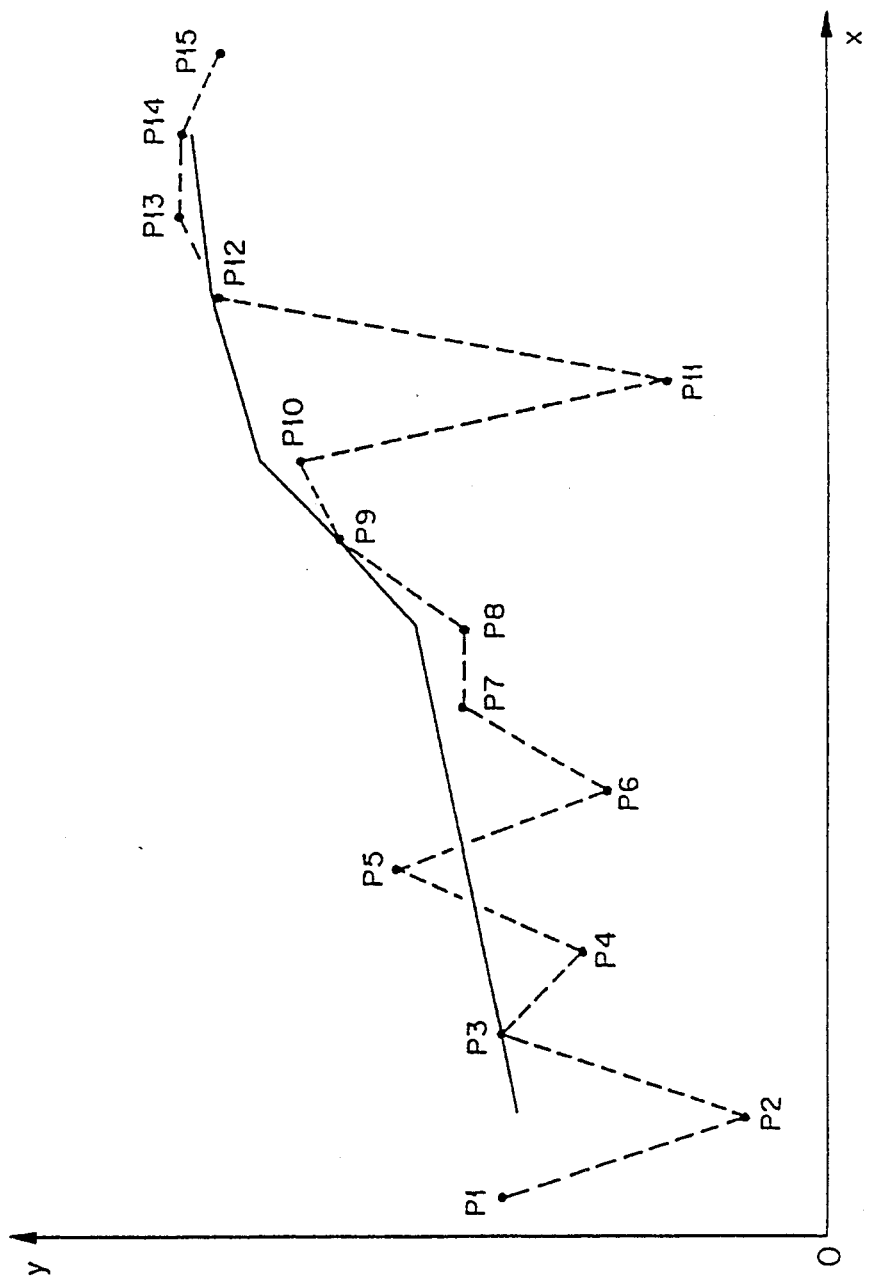

(3) Mode 3 (FIGS. 14, 19 and 20)

The first smoothing process is performed in the same manner as in the above described Mode 1.

The smoothing process from the second time is performed in the following procedure which may be regarded as a compromise between Mode 1 and Mode 2.

A line passing the center of the ellipse $(A_i, B_i)$ (i=2, 3, . . . ) at an angle $\Psi_1$ with the x-axis is drawn to a terminal point $(Ex1_1, Ey1_1)$ which is located at a median point between the center of the ellipse $(A_i, B_i)$ and the center $(A_{i+1}, B_{i+1})$ of the ellipse which is to be assigned for the next smoothing process. The coordinates $(Ex1_i, Ey1_i)$ of the terminal point is generally given by the following equations:

$$Ex1_i = \frac{A_i + A_{i+1}}{2}$$

$$Ey1_i = B_i + \frac{(A_{i+1} - A_i)\tan\psi_i}{2}$$

Next, with the terminal point $(Ex1_{i-1}, Ey1_{i+1})$ of the line drawn in the preceding smoothing process as the start point, a line is drawn at an angle $\Psi_1$ with the x-axis. The terminal point of this line is determined at a point $(Ex2_1, Ey2_1)$ in the vicinity of a median point between the center of the ellipse $(A_i, B_i)$ of the present smoothing process and the center $(A_{i+1}, B_{i+1})$ of the ellipse which is to be assigned for the next smoothing process. In other words, the point $(Ex2_i, Ey2_i)$ is located near the point $(Ex1_i, Ey1_i)$ and generally given by the following equations:

$$Ex2_i = Ex1_i = \frac{A_i + A_{i+1}}{2}$$

$$Ey2_i = Ey_{i-1} + \frac{(EX_i - Ex_{i-1})\tan\psi_i}{2}$$

Then, selecting a suitable synthetic ratio $\alpha$ ($0 < \alpha < 1$), a point ($Ex_i$, $Ey_i$) satisfying the following conditions is selected:

$$Ex_i = \alpha Ex1_i + (1-\alpha)Ex2_i$$

$$Ey_i = \alpha Ey1_i + (1-\alpha)Ey2_i$$

A line is drawn from the terminal point ($Ex_{i-1}$, $Ey_{i-1}$) of the line drawn in the preceding smoothing process to the point ($Ex_i$, $Ey_i$).

The suitable $\alpha$ value, which basically depends on the degree of variations of data points subjected to the smoothing, may be determined by experience. The presently available best procedure of determining the $\alpha$ value is as follows.

Generally speaking, when the certainty factor CF derived by a smoothing process presents a large value, e.g., not less than 0.9, the center of the ellipse assigned for the smoothing process may be regarded as the center of the distribution of data points to be smoothed. A larger certainty factor means that data points are aligned more linearly, so that Mode 1 may be employed for the smoothing.

For the reason given above, when the certainty factor $CF_i$ (e.g. corresponding to linearity, as indicated in FIGS. 12A, 12B, 13A and 13B, as discussed above) presents a larger value, priority is given to Mode 1 to minimize deviation or divergence of the smoothed data from the original data and correspondingly the $\alpha$ value is increased. Whereas, when the certainty factor $CF_i$ presents a small value, Mode 2 is given the first priority to achieve maximized smoothing when divergence of smoothed data from original data is likely to be small and the $\alpha$ value is decreased. Thus by monitoring the linearity or certainty factor in Mode 3, dynamic adjustment of weighting of the respective contributions of the results of smoothing in accordance with each of Mode 1 and Mode 2 can be achieved. In a sequence of the smoothing processes, however, abrupt changes of the $\alpha$ value may result in an awkward line, so that the certainty factor $CF_{i-1}$ derived in the preceding smoothing process is utilized to determine the $\alpha$ value by the following equation so as to prevent such awkwardness:

$$\alpha = \frac{CF_i - \{CF_{i-1}^2 + (1 - CF_{i-1})^2\}}{1 - \{CF_{i-1}^2 + (1 - CF_{i-1})^2\}}$$

thus causing $\alpha$ to be changed gradually over several smoothing process points.

Referring to FIG. 19, the point P5 is assigned as the center of the ellipse and five points P3–P7 are selected for the second smoothing process. Similarly, the point P7 is next assigned as the center of the ellipse and five points P5–P9 are selected for the third smoothing process.

By repeating the above-described procedure, a smoothed line or a line formed by true data points with reduced noise is drawn as indicated by a full line in FIG. 20.

Next, several examples of noise removal and data smoothing carried out by the present invention will be described with reference to FIGS. 21 and 22A–22C.

Figure 21:
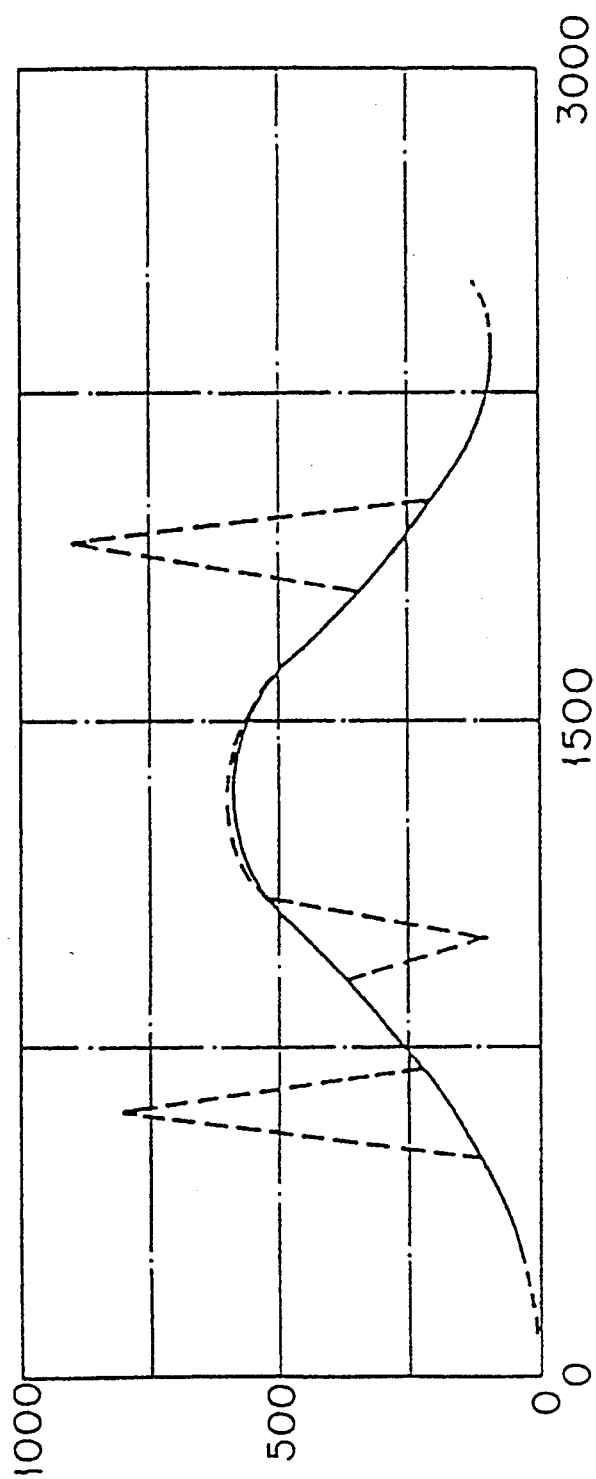
FIG. 21 is a diagram showing an example of a noise removal carried out by the data smoothing method of the invention.

FIG. 21 illustrates an example of a noise removal carried out by the foregoing Type 2 of the linearity evaluation and Mode 3 of the smoothing. The broken line indicates an original data subjected to a noise removal and the full line the result of the noise removal achieved by the present invention.

Figure 22A:
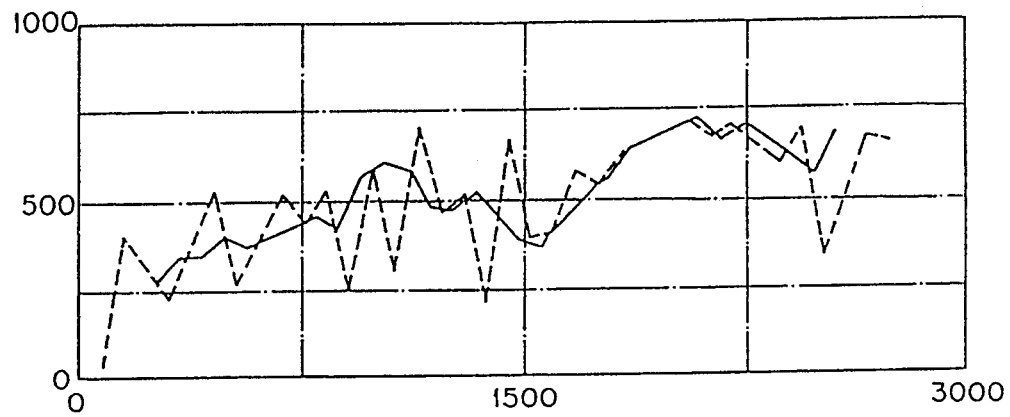
FIGS. 22A, 22B and 22C are diagrams showing examples of data smoothing carried out by the mode 1, mode 2 and mode 3, respectively.
Figure 22B:
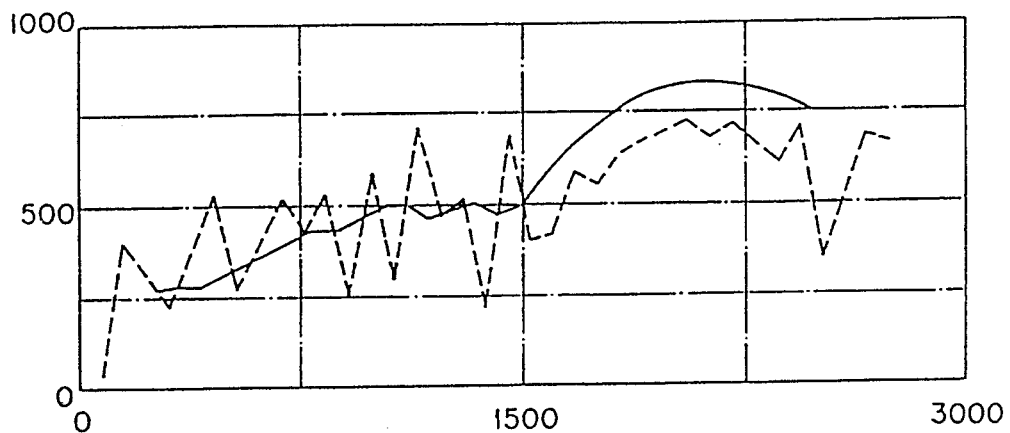
Figure 22C:
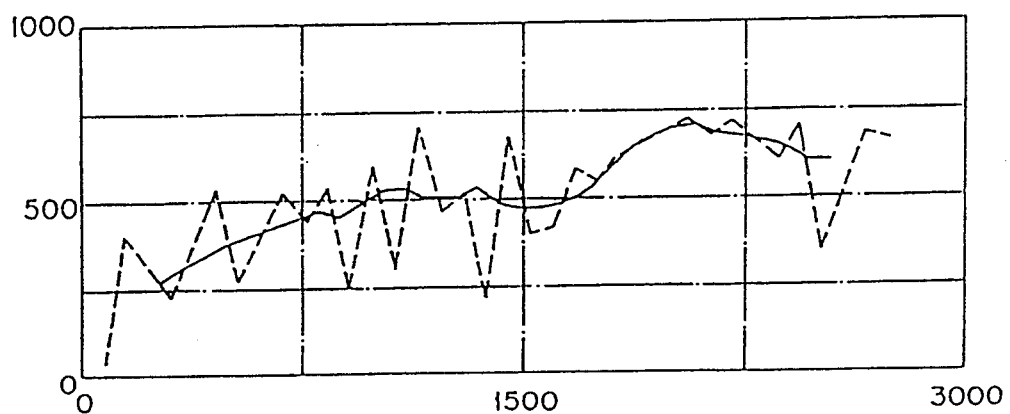

FIGS. 22A–22C illustrate examples of data smoothing carried out by Mode 1, Mode 2 and Mode 3, respectively. Type 2 of the linearity evaluation is employed for these examples.

Next, a configuration for generating the above-described multi-dimensional membership function will be described with reference to FIG. 23.

Figure 23:
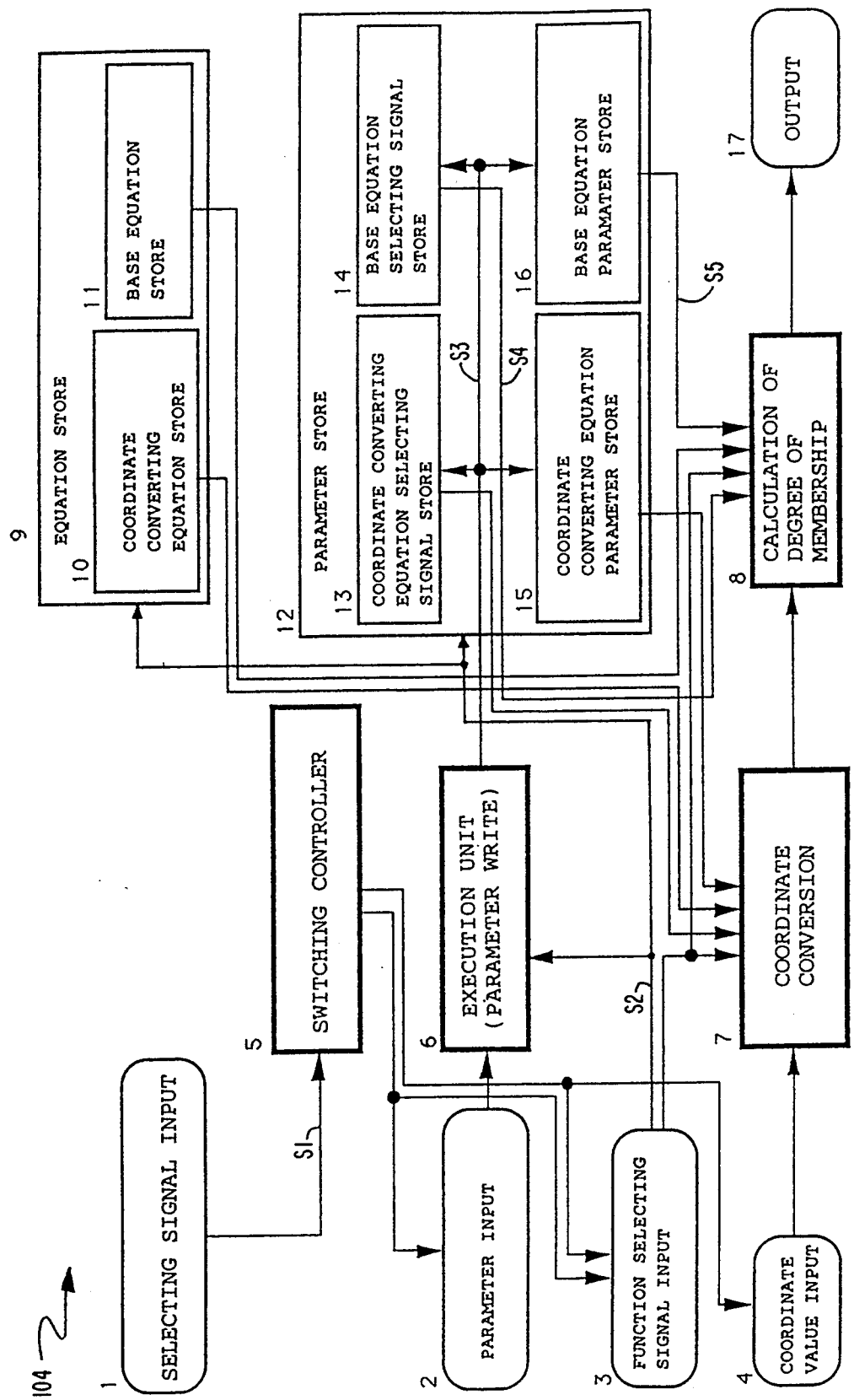
FIG. 23 is a block diagram illustrating the configuration of an embodiment of a multi-dimension membership function generator according to the invention.

In FIG. 23, a signal S1 for switching between calculation of the degree of membership and writing of set parameters is fed through an input 1 for selecting a function to be implemented in the operation of the multi-dimensional membership function generator 104. An input 2 for inputting parameter for setting a multi-dimensional membership function is provided for feeding specific numerical values for parameters for setting the multi-dimensional membership function, for example, coordinates of the center of an elliptic membership function, when the writing of set parameters is selected by signal S1. An input 3 for inputting a multi-dimensional membership function selecting signal S2 is provided for feeding a signal for selecting any particular one from equations and parameters held in a multi-dimensional membership function store 9 and a multi-dimensional membership function setting parameter store 12, later referred to, upon executing both calculation of degree of membership and writing of set parameters. A coordinate value signal input 4 is provided for feeding coordinate values of a particular data point in a space where a multi-dimensional membership function exists at which the degree of membership is to be calculated, when the degree of membership has been selected by signal S1. It should be noted that, if Gaussian distributions as represented in the three-dimensional elliptic membership function, the membership function will have a finite value for every possible point in the space. Nevertheless, the membership function may have a very small or effectively zero value for exceptional data points, thus effectively excluding them from the evaluation. The above-mentioned inputs 2–4 are controlled by a switching controller 5 in accordance with a selected function, that is, the calculation of the degree of membership or writing of set parameters. Specifically, inputs 3, 4 are made effective when the calculation of degree of membership is selected, and otherwise inputs 2, 3 are made effective. An execution unit 6 writes specific parameter values fed through input 2 associated with a multi-dimensional membership function selected by input 3 into store 12. Since the three-dimensional elliptical membership function exists in a coordinate system different from the coordinate system of the input data, a coordinate converting unit 7 carries out functions corresponding to move and rotation transformations of a multi-dimensional membership function in preparation for calculating the degree of membership of each data point in a particular sample of data points being evaluated in accordance with a three dimensional elliptical membership function centered at a location and rotated by an angle specified by parameters input at input 2. Specifically, unit 7 employs one of a plurality of coordinate converting equations held in store 10 and a set of parameter values for coordinate converting equations held in store 15 to perform a coordinate converting calculation for coordinate values fed through input 4. In this event, when signal S2 is fed through input 3 for selecting a multi-dimensional membership function, a coordinate converting equation selecting signal S3 and coordinate converting equation parameter values are read out of stores 13 and 15, respectively, in response to signal S2 to coordinate conversion block 7, and then an appropriate coordinate converting equation is read out of store 10 in response to signal S2.

A degree of membership calculating unit 8 employs one of multi-dimensional membership functions held in store 11 which is read out in response to signal S2 and a set of parameter values of multi-dimensional membership function base equations to calculate the degree of membership for each data point in the sample, in turn, based on the result of the calculation performed by unit 7. In this event, when signal S2 is fed through input 3, a basic equation selecting signal S4 and basic equation parameter values S5 are read out of stores 14 and 16, respectively, and then a multi-dimensional membership function base equation is read out of store 11 in response to signal S2. Store 9 holds equations associated with the multi-dimensional membership functions and is composed of an area 10 for holding coordinate converting equations for move and rotation transformations of the multi-dimensional membership function and an area 11 for holding basic equations for calculating the degree of membership for the multi-dimensional membership function. Store 12 holds specific types and parameter values of the multi-dimensional membership functions and is composed of an area 13 for holding a signal for selecting which of coordinate converting equations held in store 10 a multi-dimensional membership function corresponding to signal S2 fed through input 3 is to utilize, an area 14 for holding a signal for selecting which of the basic converting equations held in store 11 which a multi-dimensional membership function corresponding to signal S2 is to utilize, an area 15 for holding specific parameter values, for example, the coordinates of the center of an elliptic membership function, of a coordinate converting equation utilized by a multi-dimensional membership function corresponding to signal S2, and an area 16 for holding specific values, for example fuzzy entropy of an elliptic membership function, of a multi-dimensional membership function base equation utilized by a multi-dimensional membership function corresponding to signal S2.

Thus, in accordance with the architecture of the multi-dimension membership function generator 104 for carrying out the method of the invention, the input values to be evaluated and the general equations and particular parameters to be used in such equations are assembled in a processing pipeline of processors 7 and 8 for respectively performing coordinate conversion for choosing, locating and rotating of the membership function by processor 7 and calculation of a degree of membership of a data point in a particular specified sample of data points by processor 8. The result of calculation performed by unit 8 is delivered to an output 17 for outputting a degree of membership for the data point coordinates input at input 4. The process is then repeated for other data points in the sample to determine the total degree of membership for all data points in the sample. The process can then be reiterated over the sample with increased or decreased angle $\theta$ in order to optimize the evaluation function to arrive at angle $\Psi$ which maximizes the total degree of membership for data points in the sample. As indicated with reference to FIGS. 14-22, angle $\Psi_i$ is used to carry out the smoothing of data points in accordance with a selected one of Modes 1, 2 and 3, described above by means of a smoothing filter 100 which includes the multi-dimension membership function generator 104.

Figure 24:
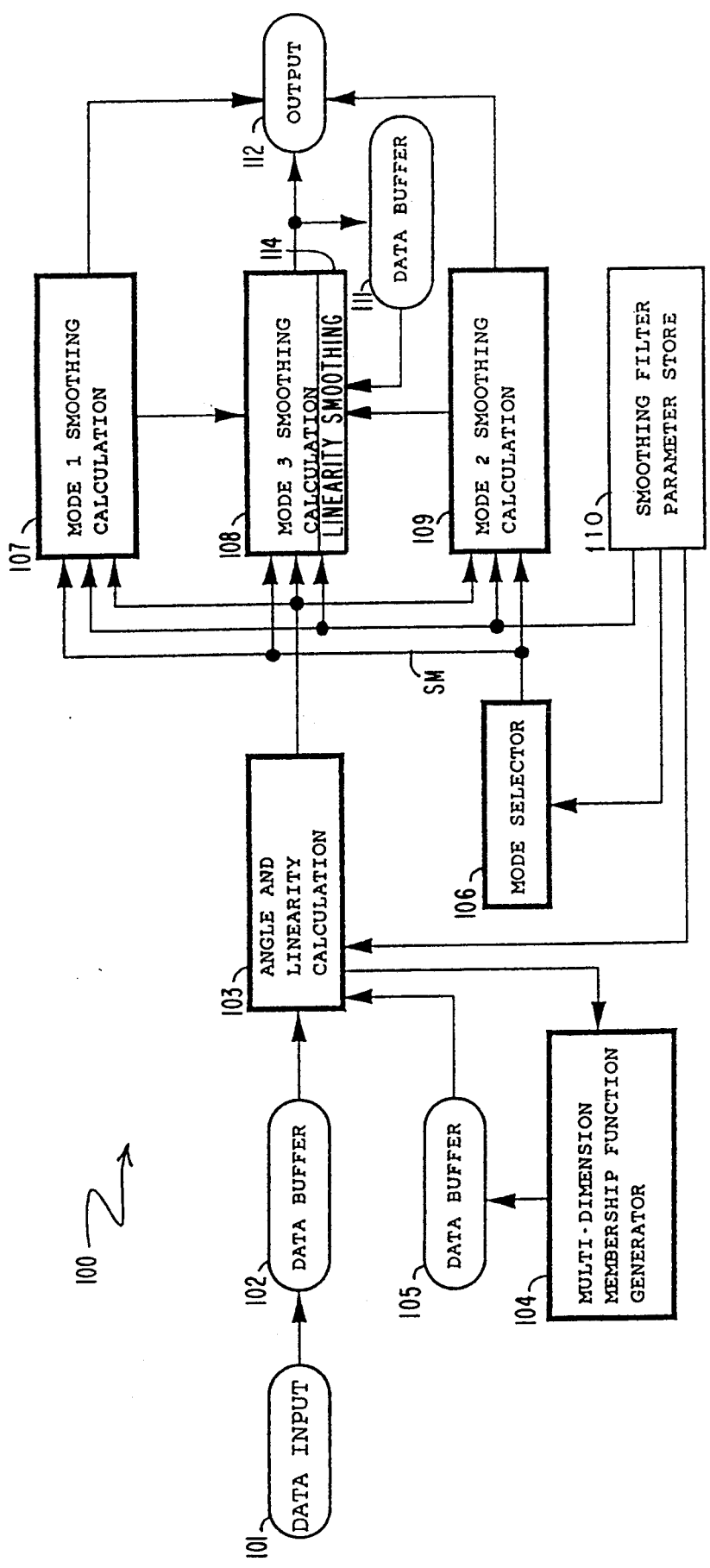
FIG. 24 is a block diagram illustrating a fuzzy smoothing filter for performing data smoothing in accordance with the data processing method of the invention.

Next, a fuzzy smoothing filter 100 having the above-mentioned multi-dimensional membership function generator as a constituent thereof will be described with reference to FIG. 24. It should be noted that the fuzziness of the smoothing filter derives from the fuzziness expressed by the three-dimensional membership function generator 104. Data fed through a data input terminal 101 is supplied through a data buffer 102 to an angle and linearity evaluation value calculating unit 103 for calculating the angle and the linearity evaluation value of the inputted data. As indicated above, this is done by control and input of data to multi-dimensional membership function generator 104, iterating through data points in a sample and reiterating through the sample for different angular values. A rotation of the ellipse for evaluating the linearity, as has been previously described, is effected in association with writing of set parameters executed by a multiple dimensional membership function generating unit 104. Multiple dimensional membership function generating unit 104 calculates the degree of membership of each data point for an elliptic contour when calculating unit 103 determines the angle and evaluates the linearity. Degrees of membership calculated by the unit 104 are temporarily held in data buffer 105 before being supplied to unit 103 for evaluation.

A mode selector 106 selects one from among the aforementioned modes 1-3 based on information or a mode setting parameter held in store 110. For performing calculations in modes 1-3, three smoothing units 107, 108 and 109 are provided which, responsive to a control signal SM from mode selector 106, perform data smoothing in their respective modes based on calculation results of unit 103 and information held in store 110. A data buffer 111 is coupled to smoothing unit 108 for temporarily holding the output of the unit 108 or a linearity evaluation value until next smoothing is performed by unit 108. By temporarily storing the output of Mode 3 smoothing calculation means 109 and feeding it back through linearity smoothing means 114, preferably arranged as a part of Mode 3 smoothing calculation means 109, abrupt changes in $\alpha$ can be avoided. Linearity smoothing means 114 performs a calculation of $\alpha$, preferably in accordance with the equation given above, and avoids abrupt changes in $\alpha$ by spreading changes over two or more smoothing processes. Thus, awkwardness of the resulting line is reduced while providing dynamic changes in weighting between different smoothing modes. The linearity evaluation value calculated by any of units 107-109 is delivered to output 112. The data thus smoothed by the fuzzy smoothing filter may be displayed for monitoring and controlling operating conditions of a plant or the like.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A fuzzy smoothing filter for smoothing data including a sequence of measured points plotted in an orthogonal coordinate system comprising:
   a data input means for inputting data to be smoothed including a plurality of data points;
   a multi-dimensional membership function generating means for calculating a degree of membership for said inputted data;
   a calculation means for deriving an angle of said data and calculating the linearity of said data;
   smoothing means coupled to receive the angle and the linearity of said data from said calculation means for executing a smoothing operation in a plurality of modes;
   a selector means for selecting one mode from among the plurality of smoothing modes; and
   a storage means for holding smoothing filter parameters supplied to said calculation means and said selector means.

* * * * *

UNITED STATES PATENT AND TRADEMARK OFFICE
CERTIFICATE OF CORRECTION

PATENT NO. : 5,398,303
DATED : March 14, 1995
INVENTOR(S) : Masato Tanaka

It is certified that error appears in the above-indentified patent and that said Letters Patent is hereby corrected as shown below:

```
Column 5, line 16, after "respectively" insert "."
          line 37, change "Z" to "A"
          line 39, change "α" to --a--
          line 45, change "θ›" to "θ'"

Column 6, after line 1, insert:
```

$$E(\theta) = \frac{T(\theta)}{S(\theta)} = \frac{\sum t_i}{\sum t_{si}} = \frac{\sum M(X_i, Y_i, \theta)}{\sum M(X_{si}, Y_{si}, \theta)} \qquad (9)$$

```
Column 8, line 1, delete "-continued"

Column 12, line 29, change "$2" to "S2"
```

Signed and Sealed this

Thirtieth Day of May, 1995

Attest:

BRUCE LEHMAN

*Attesting Officer*  *Commissioner of Patents and Trademarks*